(12) United States Patent
Inoue et al.

(10) Patent No.: US 7,697,378 B2
(45) Date of Patent: Apr. 13, 2010

(54) INFORMATION REPRODUCING DEVICE

(75) Inventors: Masaomi Inoue, Fukuoka (JP); Nobuo Jikuya, Fukuoka (JP); Yuuji Toyomura, Fukuoka (JP); Youichi Maehara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 852 days.

(21) Appl. No.: 11/509,607

(22) Filed: Aug. 25, 2006

(65) Prior Publication Data

US 2007/0050797 A1 Mar. 1, 2007

(30) Foreign Application Priority Data

Aug. 30, 2005 (JP) .............................. 2005-248974

(51) Int. Cl.
*G11B 7/085* (2006.01)
(52) U.S. Cl. .................. 369/30.32; 369/30.24; 720/671
(58) Field of Classification Search ............. 369/30.23, 369/30.32, 30.24, 44.14, 44.31, 44.33, 44.39, 369/44.28; 720/671, 619; 359/824
See application file for complete search history.

(56) References Cited

U.S. PATENT DOCUMENTS

| 7,187,506 B2 * | 3/2007 | Maehara et al. ............. 359/813 |
| 2005/0155047 A1 | 7/2005 | Kakuta et al. |
| 2006/0001987 A1 | 1/2006 | Maehara et al. |
| 2006/0020957 A1 * | 1/2006 | Kim et al. .................... 720/692 |

FOREIGN PATENT DOCUMENTS

| JP | 63253544 | 10/1988 |
| JP | 4192169 | 7/1992 |
| JP | 8339564 | 12/1996 |

* cited by examiner

*Primary Examiner*—Ali Neyzari
(74) *Attorney, Agent, or Firm*—Dickinson Wright PLLC

(57) ABSTRACT

An information reproducing device includes an information recording medium housing portion 8 for housing an information recording medium 7 that is detachably attached, a pickup 75 for reading information recorded at least on the information recording medium 7, and a pickup restrainer 94 for restraining a displacement that exceeds a normal operating range of the pickup 75, wherein the pickup restrainer 94 is constructed to displace in response to loading/unloading of the information recording medium 7 into/from the information recording medium housing portion 8.

17 Claims, 22 Drawing Sheets

INFORMATION REPRODUCING DEVICE

BACKGROUND OF THE INVENTION

1. Field of the Invention

The present invention relates to an information reproducing device that is capable of reproducing at least the information recorded on an information recording medium such as an optical disk, or the like, 2. Description of the Related Art An amount of data is rapidly increased with the rapid development of the recent digital technology, and various information recording media have been developed to fit in with user's various applications. As examples of such information recording media, hard disk, optical disk, semiconductor memory, and the like can be listed.

Meanwhile, the information reproducing device, the personal computer, etc. employing these information recording media are in user's strong demand such that the user wishes to use the device not only in a room but also out of doors. As the device that assumes such mobile application, notebook mobile personal computer, mobile information terminal typified by PDA, cellular phone, mobile game device, digital still camera, digital video camera, and the like, for example, can be listed.

In case the handled contents in the mobile applications are mainly the still image or the text data, i.e., in case only a small recording capacity of the information recording medium is required, normally the semiconductor memory is often employed. The semiconductor memory possesses such merits that the memory has a small consumption power, the memory is resistant to a falling impact because no mechanism portion is provided, and the memory has a high data transfer speed. However, since the semiconductor memory has a high cost per memory capacity, such memory is unsuitable as the recording media for the contents such as the moving picture, and the like that need a large amount of data.

In contrast, the information recording medium using the optical dusk is excellent in superiority in cost per memory capacity in terms of exchangeability of the optical disk, random access performance, and productivity of the disk when manufactured as the read only media (ROM). In particular, the information recording medium using the optical disk is the mainstream of the information recording media used to record the contents such as the moving picture, and the like that need a large amount of data.

In the information reproducing device constructed to reproduce the information at least from the information recording medium using the optical dusk, a light emitted from a laser light source, for example, must be guided to the information recording medium via the optical member, an image is formed on a recording surface of the information recording medium, and it must be sensed based on a reflected light from a recording surface whether or not a minute pit formed on the recording surface in order of µm is present. Therefore, a very high alignment accuracy of a relative positional relationship between the optical member used to guide a light emitted from a light source to the information recording medium and form an image thereon and the information recording medium is needed.

Meanwhile, in the device that assumes such mobile application, the information reproducing device is always exposed to a risk of the strong impact applied when such device is dropped, or the like. In particular, the pickup is used guide a light from a light source to a recording surface of the information recording medium and transfer a reflected light from a recording surface. For this reason, a position of the pickup must be controlled at a high speed and with high precision such that the pickup is always kept at an equal distance to the recording surface of the information recording medium, as explained in detail later, and therefore the pickup has such a structure that its position can be displaced very easily (by a week force). Therefore, when a strong external force is applied to the information reproducing device by the falling impact, or the like, the pickup is displaced to exceed a normal range of position control, i.e., a normal operating range. In some cases the pickup itself, for example, is caused to hit other member and is damaged or the member such as the suspension wire, or the like for supporting the pickup, for example, suffers unrecoverable damage by the buckling deformation, or the like.

With respect to the information reproducing device in the prior art, the structures disclosed in JP-A-63-253544, JP-A-08-339564, and Patent Literature 3, for example, are known as the measure against the impact that the pickup receives.

In JP-A-63-253544, the moving portion (pickup) consisting of an objective lens, a focus coil, and a tracking coil and an objective lens driving unit having a protecting means for relaxing an impact force applied to the pickup from the outside are disclosed. According to Patent Literature 1, it is mentioned that, since a displacement of the pickup is restrained by covering the pickup with the protecting means made of a cover, a breakage of the pickup can be prevented previously even when the pickup gets an impact force caused by the collision with other mechanism elements.

In JP-A-08-339564, in the configuration that a focal length of a light source to the recording medium is adjusted by moving the objective lens supporting member (pickup), which holds the objective lens, along the optical axis direction of the objective lens, such a structure is disclosed that a displacement of the pickup is restrained by causing an engaging member provided to an outer side of the pickup to engage with a projection, or the like provided to a part of the focus coil contained in the pickup. According to Patent Literature 2, it is mentioned that there is no need to provide the cover, or the like to the pickup consequently and it can be prevented that the objective lens supporting member runs off the chassis or the objective lens collides with the recording surface of the information recording medium.

In JP-A-04-192169, such a structure is disclosed that an optical head housing portion for housing the optical head including the pickup is provided, the optical head is housed in the optical head housing portion when the information recording medium is not inserted into the device, and the optical head is fixed by a magnet in the optical head housing portion while a power supply is turned off. According to Patent Literature 3, it is mentioned that, since the optical head is housed and fixed to the optical head housing portion, a work to prevent a damage of the optical head can be omitted when a main body of the device is moved, for example, and also a dustproof effect can be achieved.

However, in the configuration shown in JP-A-63-253544, since the pickup is constructed such that it can be displaced at least in the inside of the protecting means made of the cover, the pickup when accepts the impact is displaced in the inside of the cover. However, the cover itself has an action to restrict a displacement of the pickup but has no action to absorb an impact force. In JP-A-63-253544, the case where a runaway of the optical head main body is caused by a driving motor in the magnetic circuit to move largely is taken up as the problem. In this case, since an impact force caused by the fall, or the like, for example, is quite larger than that caused by the runaway of the magnetic circuit, it is difficult to protect sufficiently the pickup itself and the peripheral mechanism of the pickup from the failure caused by such large impact force. A configuration that a buffer material is arranged further in the inside of the cover may be considered, but this configuration is unsuitable for the information reproducing device in the mobile application since reduction in size of the device becomes difficult because of an increase in size and weight of the cover.

In the case of the configuration shown in JP-A-08-339564, like the case in JP-A-63-253544, it is also difficult to protect sufficiently the pickup from the failure caused by a large impact force generated by the fall, or the like. Also, in the configuration shown in JP-A-08-339564, since a latching means is provided in a position that is away from a center of gravity of the pickup, a local stress is applied to the latching means when the pickup receives a strong impact. There is the problem about reliability.

According to the configuration shown in JP-A-04-192169, the impact that the optical head containing the pickup gets can be absorbed by optimizing the structure of the optical head housing portion to fit for a purpose, although not explicitly shown in Literature. Thus, it is expected that the pickup and its peripheral mechanism are protected from the failure caused by the large impact force generated by the fall, or the like. However, in JP-A-04-192169, since the optical head is moved horizontally in the optical head housing portion and housed, the optical head housing portion is arranged on the outside of the outermost periphery of the information recording medium such as the optical disk, or the like and thus a size of the device is increased. In particular, in the information reproducing device that assumes the mobile application, an increase in size of the device is unacceptable from a viewpoint of portability.

SUMMARY OF THE INVENTION

It is an object of the present invention to provide an information reproducing device capable of preventing an optical pickup and its peripheral mechanisms from a failure or a defective operation caused by a strong impact.

An information reproducing device of the present invention has been made in view of the above problem, and includes an information recording medium housing portion for housing an information recording medium that is detachably attached; a pickup for reading information recorded at least on the information recording medium; and a pickup restrainer for restraining a displacement that exceeds a normal operating range of the pickup; wherein the pickup restrainer is constructed to displace in response to loading/unloading of the information recording medium into/from the information recording medium housing portion.

According to the information reproducing device of the present invention, it is feasible to make the pickup and its peripheral mechanisms hard to break down.

DESCRIPTION OF THE PREFERRED EMBODIMENTS

Figure 1:
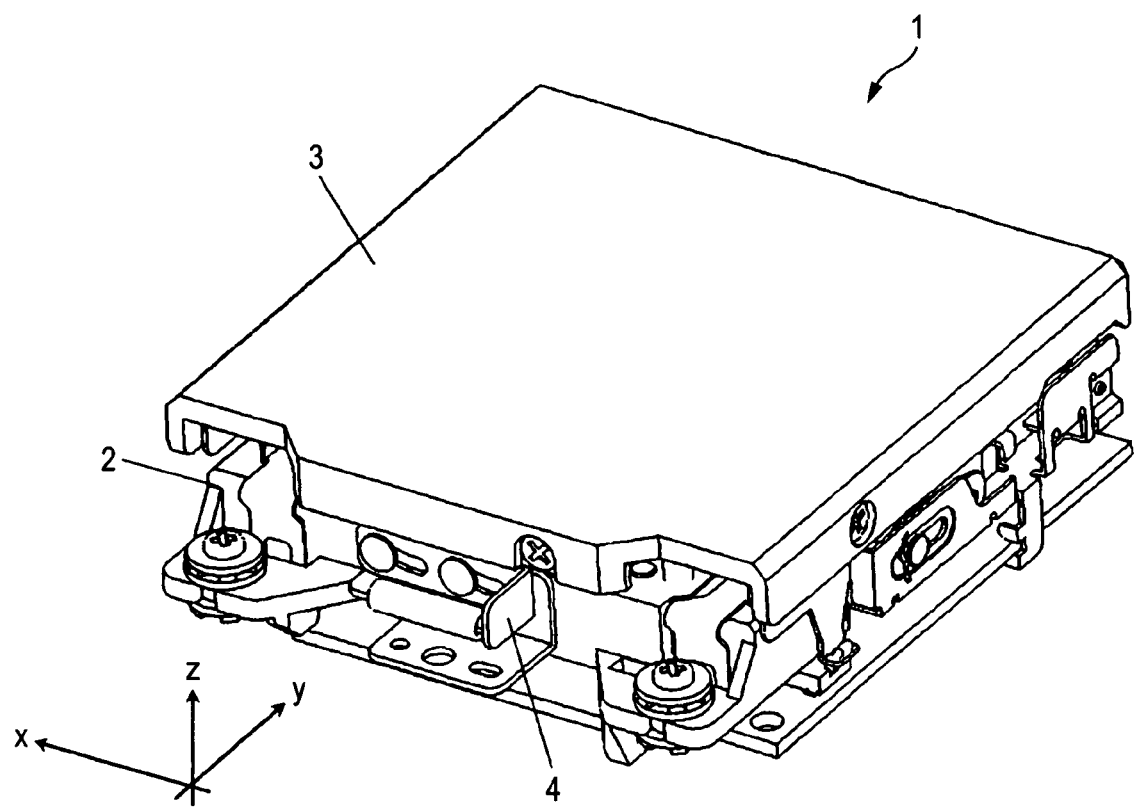
FIG. 1 is a perspective view showing an outer appearance of an information reproducing device in Embodiment 1 of the present invention.

An information reproducing device of the present invention includes an information recording medium housing portion for housing an information recording medium that is detachably attached; a pickup for reading information recorded at least on the information recording medium; and a pickup restrainer for restraining a displacement that exceeds a normal operating range of the pickup; wherein the pickup restrainer is constructed to displace in response to loading/unloading of the information recording medium into/from the information recording medium housing portion. Accordingly, the optical pickup and its peripheral mechanisms can be prevented from the failure or the defective operation caused by the very strong impact such as the falling impact, or the like not to increase a size of the device.

Also, in the present invention, the information recording medium is constructed by a cartridge and a disk-like recording medium housed in the cartridge, and the pickup restrainer is displaced by an outer peripheral end of the cartridge on an insertion side. Accordingly, since the outer peripheral end of the cartridge on the insertion side constitutes at least a line or a surface, the pickup restrainer can be easily displaced by the outer peripheral end and thus the user's operability can be improved.

Also, in the present invention, the pickup restrainer displaced in response to the unloading of the information recording medium is arranged a predetermined interval away from at least the pickup, and absorbs an impact that is applied to the pickup. Accordingly, the pickup when receives the impact is displaced, but an impact force can be absorbed because the pickup comes into contact with the pickup restrainer that is arranged in close vicinity of the pickup and has a buffer action. Therefore, the failure or the defective operation of the optical pickup and its peripheral mechanisms can be prevented from the very strong impact such as the drop impact, or the like.

Also, in the present invention, the pickup restrainer displaced in response to the unloading of the information recording medium comes into contact with at least a part of the pickup, and absorbs an impact that is applied to the pickup. Accordingly, the displacement itself of the pickup can be suppressed by an appropriate pushing force applied by the pickup restrainer. Therefore, the failure or the defective operation of the optical pickup and its peripheral mechanisms can be prevented from the very strong impact such as the drop impact, or the like.

Also, in the present invention, the pickup restrainer goes away from the pickup in answer to the loading of the information recording medium into the information recording medium housing portion, and comes close to the pickup in answer to the unloading of the information recording medium. Accordingly, when the information recording medium is taken out of the information recording medium housing portion, the failure or the defective operation of the optical pickup and its peripheral mechanisms can be prevented from the very strong impact such as the drop impact, or the like.

Also, in the present invention, the pickup restrainer is displaced in a normal direction to a recording surface of the information recording medium in answer to the unloading of the information recording medium. Accordingly, since the pickup restrainer can be provided to a small space located near the information recording medium housing portion, the small-sized information reproducing device can be provided.

Also, in the present invention, the pickup restrainer is formed of an elastic tongue-like member. This tongue-like member is displaced elastically in a normal direction to the recording surface of the information recording medium in answer to the loading/unloading of the information recording medium. Therefore, the pickup and its peripheral mechanisms can be protected not to need a complicated structure.

Also, in the present invention, the pickup restrainer restrains a housing position of the information recording medium when the information recording medium is inserted into the information recording medium housing portion. Accordingly, the pickup restrainer can also be used as a position restrainer for the information recording medium in a state that the information recording medium is inserted into the information recording medium housing portion.

Also, in the present invention, a treatment of reducing a sliding friction is applied to a surface of the pickup restrainer. Accordingly, the operability can be improved when the information recording medium is loaded/unloaded into/from the information recording medium housing portion.

Also, in the present invention, the pickup restrainer is displaced in a horizontal direction of the recording surface of the information recording medium in answer to the unloading of the information recording medium. Accordingly, the pickup restrainer can be provided to a small space located near the information recording medium housing portion, and thus the small-sized information reproducing device can be provided.

Also, in the present invention, the pickup restrainer is formed of a plate-like member whose end portion is supported rotatably. The plate-like member is arranged in a position where this member is rotated together with the unloading of the information recording medium and a displacement of the pickup exceeding a normal operating range is restrained. Therefore, the pickup restrainer can be provided to a small space located near the information recording medium housing portion, and the small-sized information reproducing device can be provided.

Also, in the present invention, the plate-like member is engaged with an elastic member, and the elastic member energizes the plate-like member in a predetermined direction. Accordingly, the pickup restrainer can be constructed with a simple structure that consists of a portion to support the plate-like member and a torsion spring provided to this portion.

Also, in the present invention, a portion of the plate-like member, which comes into contact with the information recording medium when the information recording medium is unloaded, is substantially thickened. Accordingly, this arrangement makes it certain that the inserted information recording medium is brought into contact with the plate-like member, and thus the plate-like member can be turned without fail when the information recording medium is inserted.

Also, an information reproducing device of the present invention includes, a retractable information recording medium housing portion for housing a detachably attached information recording medium; a pickup for reading at least information recorded on a recording surface of the information recording medium; a carrier for carrying the pickup along the recording surface of the information recording medium housed in the information recording medium housing portion in a predetermined direction; a controller for controlling the carrier; and a pickup restrainer for restraining a displacement of the pickup exceeding a normal operating range; wherein the pickup restrainer is constructed to displace in answer to loading/unloading of the information recording medium, and the controller controls the carrier in response to open/close of the information recording medium housing portion to carry the pickup to a predetermined position. Accordingly, the pickup can be carried to a position where the pickup restrainer is arranged, and thus the pickup restrainer can be constructed small in size.

Also, in the present invention, a displacement of the pickup exceeding a normal operating range is restrained by the pickup restrainer in the predetermined position. Accordingly, the pickup restrainer can be constructed small in size and then the information reproducing device can be reduced in size.

Also, the information reproducing device of the present invention further includes a sensor for sensing the unloading of the information recording medium; wherein the controller carries the pickup to a predetermined position based on an output of the sensor. Accordingly, the pickup can be carried to a position where the pickup restrainer is arranged, in response to the user's operating condition.

Also, the information reproducing device of the present invention further includes an instructing portion for instructing the unloading of the information recording medium; wherein the controller carries the pickup to a predetermined position based on an output of the instructing portion. Accordingly, when the information reproducing device has also an information recording function, it can be prevented that an information recording action is inadvertently interrupted and also the pickup can be carried to a position where the pickup restrainer is arranged, in response to the user's operating condition.

Also, an information reproducing device of the present invention includes an information recording medium housing portion for housing a detachably attached information recording medium therein; a pickup for reading information recorded on at least the information recording medium; and a pickup restrainer for restraining a displacement of the pickup exceeding a normal operating range; wherein the pickup restrainer restrains a displacement of the pickup in a state that the information recording medium is unloaded from the information recording medium housing portion, and the recording surface of the information recording medium restrains a displacement of the pickup in a state that the information recording medium is loaded into the information recording medium housing portion. Accordingly, a concentration of the load to a particular restrainer can be prevented and also the reliability of the information reproducing device can be improved.

Also, in the present invention, the pickup contains an objective lens that focuses a light at least on the recording surface of the information recording medium, a projection portion projected toward a direction of the recording surface of the information recording medium is provided in vicinity of the pickup restrainer, and the projection portion comes in contact with the pickup restrainer or the recording surface of the information recording medium. Accordingly, the projection portion comes into contact with the opposing member to restrain a displacement of the pickup exceeding a normal operating range, and also the impact can be absorbed by the projection portion.

Also, in the present invention, the projection portion is constructed to project to a position that is closer to the recording surface of the information recording medium than the objective lens. Accordingly, the projection portion comes into contact with the recording surface of the information recording medium to restrain a displacement of the pickup exceeding a normal operating range before the objective lens comes into contact with the recording surface of the information recording medium, and also the impact can be absorbed by the projection portion.

EMBODIMENTS

The concrete contents of the present invention will be explained with reference to embodiments hereinafter.

Embodiment 1

Then, Embodiment 1 of the present invention will be explained with reference to the drawings hereunder.

FIG. 1 is a perspective view showing an outer appearance of an information reproducing device in Embodiment 1 of the present invention.

In following explanation, an xyz coordinate is employed as a coordinate space in Figures, wherein an x-axis denotes a moving direction of a carriage 70 (see FIG. 4) constituting an optical unit 21 (see FIG. 4), i.e., an axis that extends from an inner periphery of an information recording medium to an outer periphery, as explained in detail later, and its arrow direction indicates an outer peripheral direction of the information recording medium. Also, a y-axis is an axis that intersects orthogonally with the x-axis, and its arrow direction indicates an emergent direction of a light from a light source 71 (see FIG. 4) mounted on the optical unit 21 described later. Also, a Z-axis is an axis that intersects orthogonally with the x-axis and the y-axis and shows a normal to a surface of the information recording medium, and its arrow direction indicates a direction of a light emitted from an objective lens 74 (see FIG. 4) mounted on a pickup 75 described later (see FIG. 4) to the information recording medium. Also, explanation will be made by defining the arrow directions of these axes as + and their opposite directions as −.

In FIG. 1, 1 is an information reproducing device that has a function of reading the information from the optical disk, or the like, which is housed in the cartridge, for example, and on which at least the information has already been recorded (when an explanation is required of a single body such as the optical disk, or the like housed in the cartridge, such optical disk, or the like is called a "disk-like recording medium" hereinafter. Also, the disk-like recording medium and the cartridge into which this recording medium is housed are called collectively the "information recording medium" hereinafter). Also, 2 is a reproducing mechanism portion that is constructed by a mechanism used to read the information recorded on the information recording medium and a hardware such as a circuit board, and the like associated with the signal processing to control this mechanism and reproduce the information. Also, 3 is an upper surface cover formed of a resin. The user can set the upper surface cover 3 to its open state by operating an upper surface cover open lever 4, and can load/unload the information recording medium into/from the information reproducing device 1.

Figure 2:
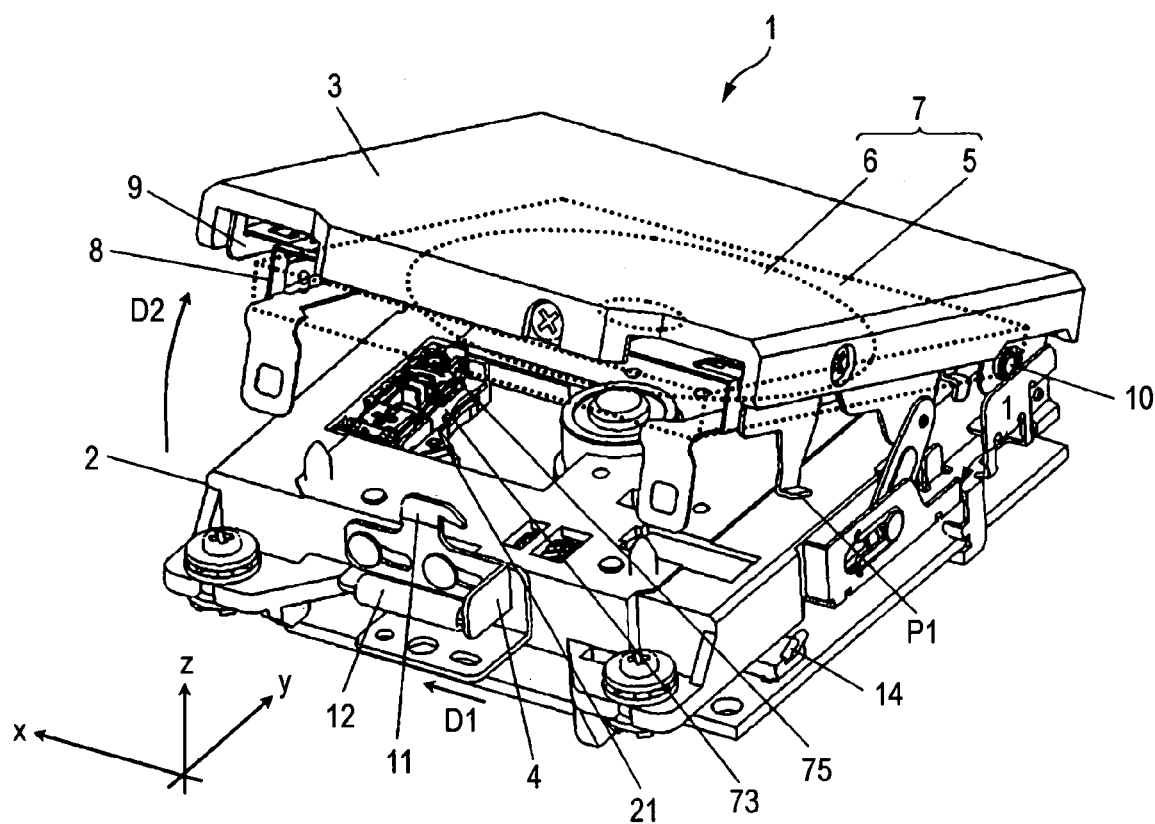
FIG. 2 is a perspective view showing a state that an upper surface cover of the information reproducing device in Embodiment 1 is opened.

FIG. 2 is a perspective view showing a state that the upper surface cover 3 of the information reproducing device in Embodiment 1 of the present invention is opened.

In FIG. 2, 5 is a disk-like recording medium, and a small-diameter optical disk having a diameter of about 30 mm, which is applicable for the mobile application, is employed in Embodiment 1. Also, 6 is a cartridge that houses the disk-like recording medium 5 therein. The disk-like recording medium 5 and the cartridge 6 constitute an information recording medium 7. Also, 8 is an information recording medium housing portion. The information recording medium 7 is loaded/unloaded into/from the information recording medium housing portion 8 by the user's operation. That is, in the information reproducing device 1 in Embodiment 1, the information recording medium 7 is constructed to be loaded/unloaded into/from the information recording medium housing portion 8.

Also, 9 is an upper surface chassis. The upper surface chassis 9 is supported by the information recording medium housing portion 8, and the upper surface chassis 9 supports the upper surface cover 3. As explained in detail later, a pickup restrainer (not shown) for restraining a displacement of the pickup 75 that exceeds a normal operating range is fitted to the upper surface chassis 9.

Also, 10 is a housing portion supporting portion that acts as a turning center of an opening/closing operation of the information recording medium housing portion 8 with respect to the reproducing mechanism portion 2. Also, 11 is a hook and 12 is a hook energizing member. When the information recording medium housing portion 8 is brought into in its close state, the hook 11 is latched by a latching member (not shown) provided to the upper surface cover 3, and thus the information recording medium housing portion 8 is kept in its close state. In contrast, when the upper surface cover open lever 4 is moved in the direction D1 by the user, the hook 11 is also moved in the direction D1 in cooperation with the upper surface cover open lever 4 and is unlatched from the latching member (not shown) provided to the upper surface cover 3. Then, the information recording medium housing portion 8, the upper surface chassis 9, and the upper surface cover 3 are displaced in the direction D2 around the housing portion supporting portion 10 as a supporting center, and accordingly the information recording medium housing portion 8 is exposed and is set to its open state. When the user inserts the information recording medium 7 into the information recording medium housing portion 8 and then pushes the upper surface cover 3 down in the opposite direction to the direction D2, the information recording medium housing portion 8 as well as the upper surface chassis 9 is moved in the direction D2 and thus the information recording medium housing portion 8 is brought into its close state shown in FIG. 1.

Also, 21 is the optical unit 21 on which an optical system for reading the information of the information recording medium 7 housed in the information recording medium housing portion 8 is mounted. Also, as explained in detail later, the optical unit 21 is constructed by a carriage (not shown) supported movably in ± directions of the x-axis, i.e., the center direction and the outer peripheral direction of the disk-like recording medium 5, along the recording surface of the disk-like recording medium 5 constituting the information recording medium 7, the pickup 75 for focusing a light emitted from the light source (not shown) onto the recording surface of the disk-like recording medium 5, an actuator 73 for controlling a position of the pickup 75 in real time in ± directions of the z-axis and ± directions of the x-axis such that the pickup 75 keeps a predetermined positional relationship to the recording surface during the reading operation, and the like.

Also, 14 is a housing portion open/close sensor that is constructed by a micro switch having a lever portion, for example. The housing portion open/close sensor 14 senses the open/close states of the information recording medium housing portion 8 by utilizing the event that a state of the housing portion open/close sensor 14 is changed by a portion P1 in response to the open/close of the information recording medium housing portion 8. As explained in detail later, an output of the housing portion open/close sensor 14 is transferred to the control portion (see a reference numeral 35 in FIG. 3) described in detail later. The control portion 35 when senses the open state of the information recording medium housing portion 8 controls to carry the optical unit 21, on which the pickup 75 is mounted, to a position where a pickup restrainer (not shown) is arranged.

Figure 3:
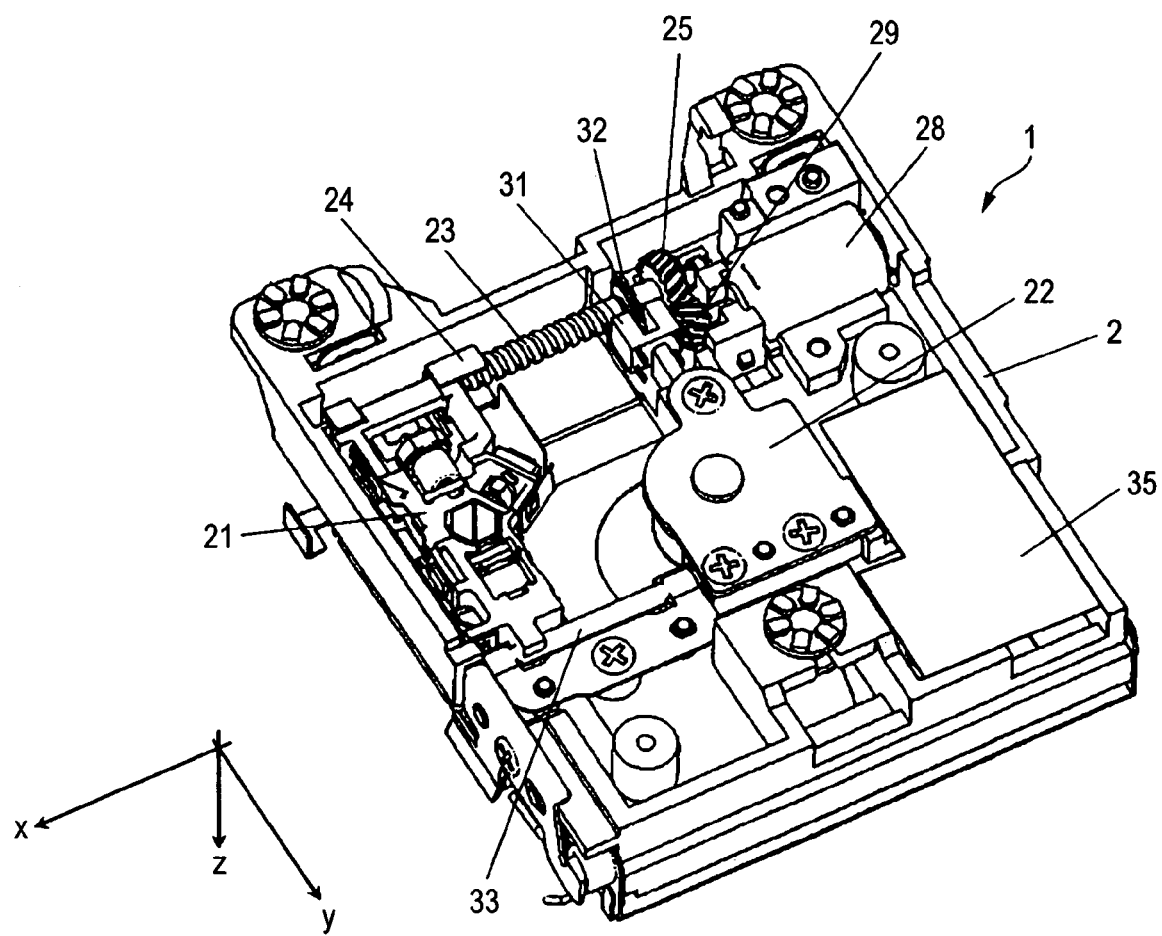
FIG. 3 is a perspective view showing a mechanism of a reproducing mechanism portion in Embodiment 1.

FIG. 3 is a perspective view showing a mechanism of the reproducing mechanism portion 2 in Embodiment 1 of the present invention when the reproducing mechanism portion 2 in FIG. 2 is viewed from the − direction of the z-axis to the + direction of the same.

In FIG. 3, 21 is the optical unit that reads the information recorded on the information recording medium 7 (see FIG. 2), as described above. Also, 22 is a spindle motor constructed by a brushless motor that acts as a power source to rotate/drive the information recording medium 7, 23 is a lead screw shaft on which a screw is cut to move the optical unit 21 in the ± directions of the x-axis, i.e., the inner/outer peripheral positions of the information recording medium 7 (not shown, see FIG. 2), 24 is a rack leaf spring that transfers a power to the optical unit 21 via the lead screw shaft 23, 25 is a lead screw shaft gear fixed to the lead screw shaft 23, 28 is a feed motor acting as a power source to turn the lead screw shaft 23, 29 is a motor gear fitted to a rotation axis of the motor 28, 31 is a photo interrupter as an optical sensor that counts the number of rotation of the lead screw shaft 23 to measure the number of rotation of the motor, 32 is a circular disk-like slit plate provided to a shaft of the lead screw shaft 23 and having a plurality of slits provided around its periphery, and 33 is a guide shaft that regulates/guides an operation of the optical unit 21 to the inner/outer peripheral positions of the information recording medium 7.

When the feed motor 28 is driven in a predetermined direction, a driving force is transferred to the optical unit 21 via the motor gear 29, the lead screw shaft gear 25, the lead screw shaft 23, and the rack leaf spring 24, and then the optical unit 21 is guided by the lead screw shaft 23 and the guide shaft 33 and moved in the ± directions of the x-axis.

Also, 35 is a control portion that is constructed by incorporating various electronic parts onto a glass epoxy substrate. A configuration of the hardware mounted into the control portion 35 will be explained in detail later. At least a CPU for counting the slits of the slit plate 32 by processing an output of the photo interrupter 31, outputting a drive signal to rotate the feed motor 28 in forward/reverse directions, and recognizing the open/close states of the information recording medium housing portion 8 (see FIG. 2) based on an output of the housing portion open/close sensor 14 (see FIG. 2), a work memory constructed by a RAM, a nonvolatile program memory constructed by a ROM, or the like, a nonvolatile memory for storing respective states of the information reproducing device 1 and constructed by an EEPROM, or the like, and the like (all not shown) are installed into the control portion 35.

In Embodiment 1, a sensor for sensing a positional origin of the optical unit 21 is not provided. Since a moving range of the optical unit 21 in the x-axis direction is decided previously depending on the mechanism, the optical unit 21 comes up to the outermost end portion of the moving range finally when the control portion 35 carries the optical unit 21 in the + direction of the x-axis (i.e., the outer peripheral direction of the information recording medium 7), for example, such that the slit number of the slit plate 32 counted by the photo interrupter 31 agrees with a predetermined number (exceeds the above moving range). Even though the lead screw shaft 23 is rotated in this state, the rack leaf spring 24 runs off the groove provided to the lead screw shaft 23. Therefore, an excessive stress is never applied to the optical unit 21 in the + direction of the x-axis, and thus the optical unit 21 is arranged to the outermost end portion in its movable range. The outermost end portion to which the optical unit 21 can move in the + direction of the x-axis is handled as an origin position upon carrying the optical unit 21. The control portion 35 can drive the feed motor 28 in forward/reverse directions, such control portion 35 can count the number of rotation of the lead screw shaft 23 based on the result obtained when the slits provided to the slit plate 32 are sensed by the photo interrupter 31 and can carry the optical unit 21 to any position in the x-axis direction after the origin position is decided in this manner. The control portion 35 when senses the close state of the information recording medium housing portion 8 by this function, as described later, can control to carry the optical unit 21 on which the pickup is mounted to a position where the pickup restrainer is arranged.

Figure 4:
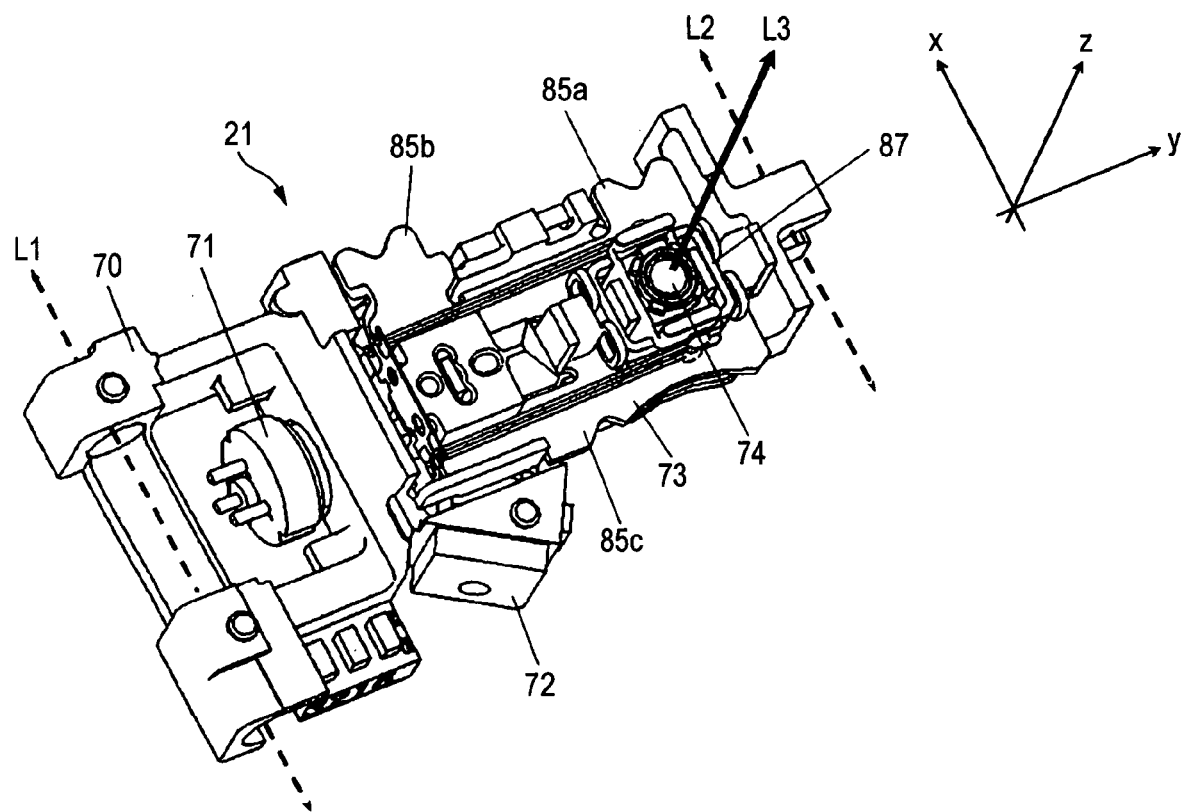
FIG. 4 is a perspective view showing a configuration of an optical unit in Embodiment 1.

FIG. 4 is a perspective view showing a configuration of the optical unit 21 in Embodiment 1 of the present invention. A configuration of the optical unit 21 in Embodiment 1 will be explained with reference to FIG. 6 as well as FIG. 2 and FIG. 3 in detail hereunder.

In FIG. 4, 70 is the carriage that constitutes a part of the optical unit 21 and is formed of aluminum, or the like that is advantageous to a machining precision, for example. The carriage 70 is supported by the lead screw shaft 23 (see FIG. 3) arranged on an L1 line along the ± directions of the x-axis and the guide shaft 33 (see FIG. 3) arranged on an L2 line in the reproducing mechanism portion 2 (see FIG. 3). The carriage 70 moves in the ± directions of the x-axis together with the rotation of the lead screw shaft 23 (see FIG. 3) on the L1 line and the L2 line as the ± directions of the x-axis and their prolonged lines, and carries the optical unit 21 to a desired position from the inner periphery to the outer periphery of the information recording medium 7 (see FIG. 2).

Also, 71 is a light source that is formed of a bluish purple laser diode whose wavelength is λ=405 nm, for example. In Embodiment 1, a high output type whose output is 5 mW is employed. The high output type bluish purple laser diode can respond to the reproduction of the information recording medium 7 having a high recording density (see FIG. 2). Also, 72 is a light receiving sensor constructed by the so-called four-segment sensor having four light receiving surfaces that are divided into a "田"-shaped type. The light receiving sensor 72 senses the light reflected from the recording surface of the disk-like recording medium 5 (see FIG. 2) constituting the information recording medium 7 (see FIG. 2), and outputs ON/OFF information on a basis of the bits recorded on the information recording medium 7. Also, the light receiving sensor 72 outputs infinitesimal displacement errors of the pickup 75 (more precisely the objective lens 74) and the information recording medium 7 (see FIG. 2), as described later, in the ± directions of the x-axis (tracking errors) and infinitesimal displacement errors of the same in the ± directions of the z-axis (focus error).

Also, 73 is an actuator which is arranged on the optical unit 21 and on which at least the objective lens 74 and the pickup 75 in which this objective lens 74 is provided are mounted. Since the actuator 73 constitutes a part of the magnetic circuit, such actuator 73 is made of a metal such as iron, nickel, or the like having a predetermined magnetic permeability or its alloy. Also, 74 is an objective lens made of a resin. The objective lens 74 guides the light from the light source 71 in the + direction of the z-axis, i.e., on the L3 line, focuses an emergent light of the light source 71 onto the recording surface of the disk-like recording medium 5 (see FIG. 2) constituting the information recording medium 7, and guides its reflected light to the light receiving sensor 72. Also, 75 is a pickup on the outer peripheral portion of which a plurality of coils are arranged, as explained in detail later. When the magnetic circuit provided to the actuator 73 is operated by supplying a current to the coils, the pickup 75 is displaced in the + directions of the x-axis and the ± directions of the z-axis. This control is carried out by the control portion 35 (see FIG. 3) based on an output of the light receiving sensor 72, and the control portion 35 (see FIG. 3) displaces the pickup 75 in the direction to cancel the tracking error and the focus error.

Also, 85a, 85b, 85c are adjusting portions provided to a part of the actuator 73 as the projecting portion. In manufacturing steps of the information reproducing device 1 (see FIG. 3), a relative positional relationship between the information recording medium 7 (see FIG. 2) and the optical unit 21 can be adjusted simply with good precision by adjusting positions of the adjusting portions 85a, 85b, 85c by means of a jig (not shown) from the opposite side to the side on which the information recording medium 7 is loaded in a situation that the information recording medium 7 (see FIG. 2) is inserted into the information reproducing device 1 (see FIG. 3) and the optical unit 21 can access the information recording medium 7.

Figure 5:
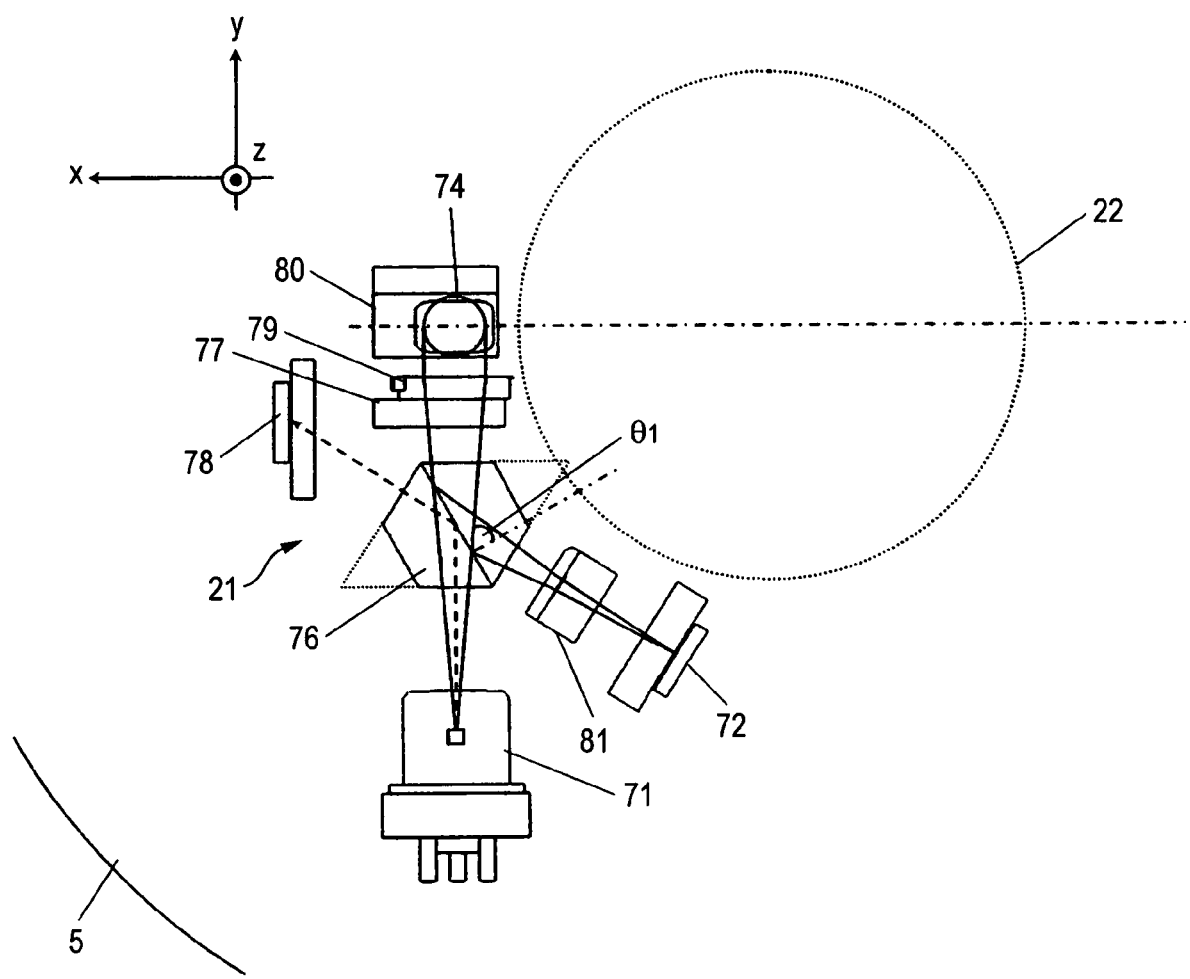
FIG. 5 is a configurative view showing details of an optical system of an optical unit in Embodiment 1.

FIG. 5 is a configurative view showing details of an optical system of the optical unit 21 in Embodiment 1 of the present invention. In FIG. 5, the information recording medium 7 loaded in the information recording medium housing portion 8 (see FIG. 2) is arranged in the + direction of the z-axis (the front direction of this sheet).

A configuration of the optical system of the optical unit 21 in Embodiment 1 will be explained in more detail with reference to FIG. 5 hereunder.

In FIG. 5, 76 is a polarization beam splitter in which a plurality of glass members are pasted together to have a polarization film at a boundary between them, and 77 is a ¼λ plate that converts a linear polarization into a circular polarization. A going light emitted from the light source 71 and a returning light reflected from the information recording medium 7 can be separated mutually by using the ¼λ plate 77 and the polarization beam splitter 76 in combination.

Also, 78 is a quantity-of-light monitor composed of a photodiode, or the like, 79 is a collimator lens made of a resin that angularly transforms an emergent light of the light source 71 into a parallel light, 80 is a mirror that reflects the light from the light source 71, which is angularly transformed into the parallel light by the collimator lens 79, in the + direction of the z-axis to guide this light to the objective lens 74, and 81 is a servo lens formed of a cylindrical lens that focuses the light is reflected from the information recording medium 7 onto the light receiving sensor 72.

In Embodiment 1, because of a necessity to separate the polarization beam splitter 76 away from the light receiving sensor 72 by a predetermined distance, the servo lens 81 whose both planes of the incident plane and the emergent plane are formed into a concave shape is employed. In Embodiment 1, the bluish purple laser diode is employed as described above, but this bluish purple laser diode accelerates a deterioration of the resin-based optical material. For this reason, it is desired that the material having a bluish purple resistance should be employed as the optical members of the polarization beam splitter 76, the ¼λ plate 77, the collimator lens 79, the mirror 80, the servo lens 81, and the like.

The optical system constructed as above will be explained in details following to the optical path hereunder.

The bluish purple laser beam emitted from the light source 71 passes through the polarization beam splitter 76, and is incident on the ¼λ plate 77 to convert the linearly polarized light to the circularly polarized light. The light passed through the ¼λ plate 77 is angularly transformed into the parallel light by the collimator lens 79, and then reflected by the mirror 80 at about 90° in the + direction of the z-axis.

In contrast, about 10% of the light emitted from the light source 71 is reflected by a laminated boundary of the polarization beam splitter 76, and is incident on the quantity-of-light monitor 78. The quantity-of-light monitor 78 outputs an optical current in response to a quantity of incident light. It is known that an optical current of the laser diode constituting the light source 71 is changed depending on an environmental temperature, and the like. In Embodiment 1, a driving condition such as a driving current, a driving voltage, or the like to drive the light source 71 is controlled by a controller (not shown) such that an optical current value that the quantity-of-light monitor 78 outputs is kept constant, so that the driving condition is controlled to get 0.4 mW as an optical output from the objective lens 74.

Then, the parallel light reflected by the mirror 80 is incident on the objective lens 74 and is absorbed by the objective lens 74. As a result, a light spot of 0.3 μm (full-width at half maximum) is formed on the recording surface of the disk-like recording medium 5 that is away from the light emitting plane of the objective lens 74 by 0.22 mm.

A reflectance of the disk-like recording medium 5 is different depending on whether the pit (not shown) recorded on the disk-like recording medium 5 is present or not. Therefore, an intensity of light reflected from the information recording medium 7 is changed depending on whether the pit is present or not.

The light reflected from the disk-like recording medium 5 turns back the optical path explained up to now in order of the objective lens 74, the mirror 80, the collimator lens 79, and the ¼λ plate 77, and then is incident on the polarization beam splitter 76. The light when reaches the boundary of the polarization beam splitter 76 is reflected at a predetermined reflectance. In Embodiment 1, an angle of reflection is set to θ1=60°, a shape of the polarization beam splitter 76 is formed as a hexagon based on this angle, and a thickness of the reflecting film at the boundary of the polarization beam splitter 76, etc. are optimized.

Normally, an angle of reflection at the boundary of the polarization beam splitter 76 is often set to θ1=45° (i.e., the polarization beam splitter 76 is a square or a rectangle) In this case, since a position of the light receiving sensor 72 is arranged just beside the polarization beam splitter 76 in the − direction of the x-axis, it becomes difficult to reduce a size of the optical system. In Embodiment 1, an outer shape of the polarization beam splitter 76 is formed as a hexagon, and an angle of reflection by the polarization beam splitter 76 is set to 60° that is larger than 45°. Therefore, an angle of the light receiving sensor 72 and the light source 71 to the optical path is formed large, and a width of the overall optical system in the x-axis direction is reduced by arranging obliquely the light receiving sensor 72.

Also, with such arrangement, the optical unit 21 (see FIG. 3) can be brought closer to the spindle motor 22. This means that the optical unit 21 can access the more inner peripheral side of the information recording medium 7, so that a capacity of the information recording medium 7 can be increased substantially.

As described above, such remarkable advantages can be attained that, since an angle of reflection at the boundary of the polarization beam splitter 76 can be set larger than 45°, a size of the optical unit 21 can reduced and also the optical unit 21 can access the more inner peripheral side of the information recording medium 7 in connection with the spindle motor 22.

Here, a shape of the polarization beam splitter 76 is not always formed as a regular hexagon. Its plane not located on the optical path may be deformed or even its plane located on the optical path may also be deformed if a minimum width of the plane not to scatter the light can be ensured. As indicated by a dotted line prolonged from a side of the polarization beam splitter 76, a shape of the polarization beam splitter 76 may be formed as a parallelogram or a pentagon. In this case, it is desired that, since the shape of the polarization beam splitter 76 on the spindle motor 22 side interferes with an arrangement of the spindle motor 22, such shape of the polarization beam splitter 76 on this side should be cut into a flat plane, as shown in FIG. 5.

Then, the light reflected by the laminated boundary of the polarization beam splitter 76 is angularly transformed by the servo lens 81 composed of a cylindrical lens such that an aspect ratio of an optical spot is set to 1:1, and then is incident on the light receiving sensor 72 constructed as a four-segment sensor. The incident light is converted into an optical current by the light receiving sensor 72. Thus, the presence or absence of the pit formed on the disk-like recording medium 5 can be sensed, i.e., the recording information recorded on the information recording medium 7 (see FIG. 2) can be read, based on this converted value.

Figure 6:
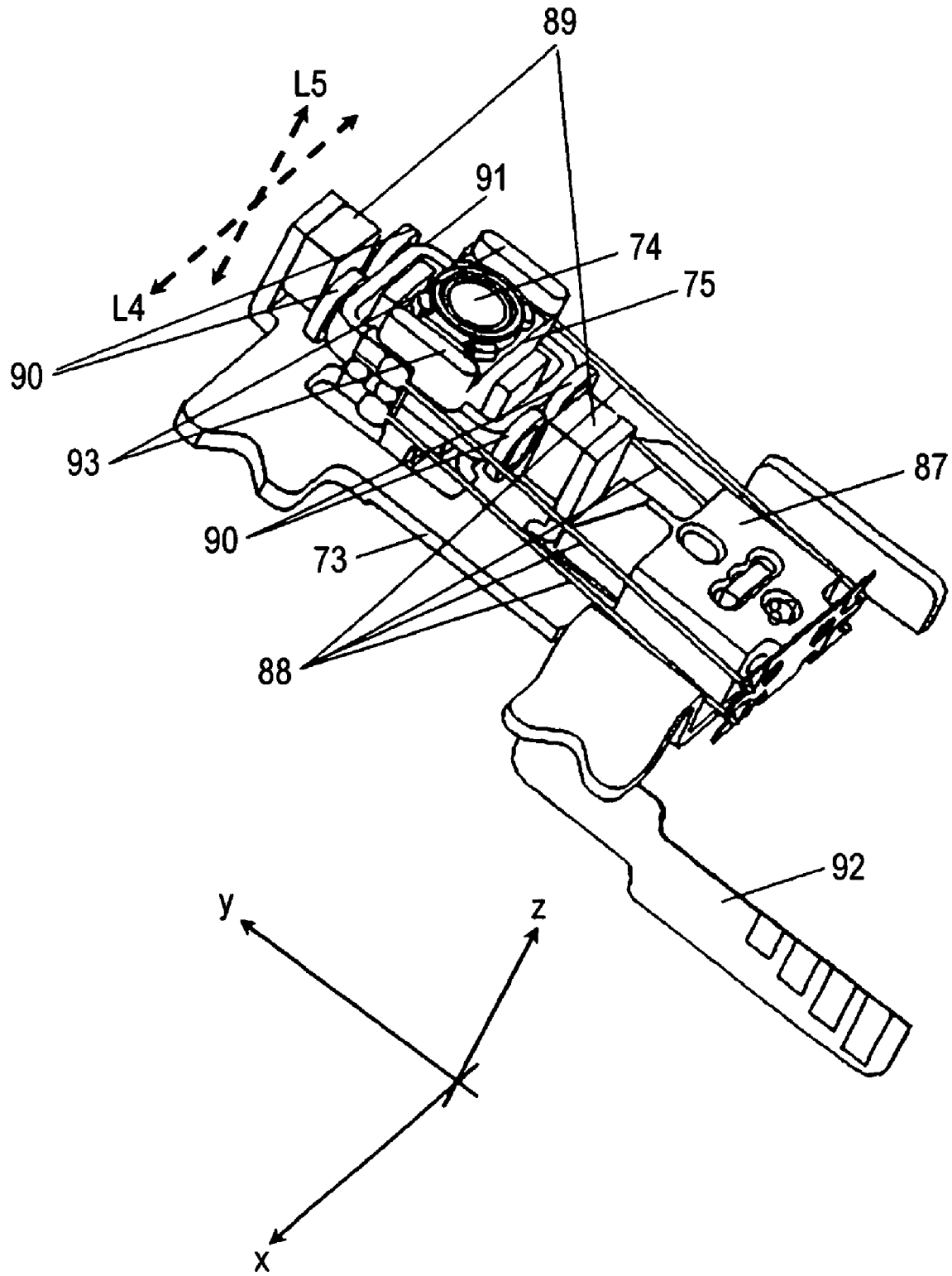
FIG. 6 is a perspective view showing a configuration of an actuator in Embodiment 1.

Then, out of these optical members constituting the optical unit 21, the light source 71, the polarization beam splitter 76, the ¼λ plate 77, the quantity-of-light monitor 78, the collimator lens 79, the mirror 80, the servo lens 81, and the light receiving sensor 72 are arranged in the carriage 70 (see FIG. 4), while the objective lens 74 and the pickup 75 are arranged in the actuator 73 (see FIG. 6). In Embodiment 1, the discrete parts are used as these optical members and simple configurations are employed.

FIG. 6 is a perspective view showing a configuration of the actuator 73 in Embodiment 1 of the present invention. A structure of the actuator 73 and a configuration used to displace a position of the pickup 75 will be explained in detail with reference to FIG. 6 hereunder.

In FIG. 6, 75 is the pickup that has already been explained simply. The pickup 75 supports directly the objective lens 74. Four tracking coils 90 and one focus coil 91 are provided to an outer peripheral portion of the pickup 75. The tracking coils 90 and the focus coil 91 are positioned in the magnetic circuit formed by a permanent magnet 89 that is placed on the actuator 73.

The pickup 75 is supported in the air by four suspension wires 88 that are fixed to a suspension holder 87 arranged on the actuator 73, and each suspension wire 88 is made of beryllium copper and has a length of 8 mm and a diameter of 50 μm. An objective lens unit 84 is infinitesimally displaced in an L4 direction along in the ± directions of the x-axis when a current is supplied to four tracking coils 90 via the suspension wires 88, while the objective lens unit 84 is infinitesimally displaced in an L5 direction along in the ± directions of the z-axis when a current is supplied to the focus coil 91.

Also, 92 is a flexible printed circuit (FPC) that is connected to the control portion 35 (see FIG. 3) to supply a drive current to the tracking coils 90 and the focus coil 91.

Also, 93 is a projection portion that is provided in vicinity of the objective lens 74 in the pickup 75 and is made of an elastic resin that is softer than at least the disk-like recording medium 5 (see FIG. 2). The projection portion 93 is constructed to project rather than the objective lens 74 in the + directions of the z-axis.

Explanation will be continued with reference to FIG. 6 as well as FIG. 3, FIG. 4, and FIG. 5 hereunder.

The light receiving sensor 72 constructed by the four-segment sensor being already explained with reference to FIG. 5 outputs information about a clearance between the disk-like recording medium 5 and the pickup 75 and information about a clearance between the light spot formed on the disk-like recording medium 5 and the recorded pit sequence, in addition to the above recorded information. These information are transferred to the control portion 35 (see FIG. 3) already explained and are analog-digital converted by a processing circuit (not shown). Also, the information about a clearance between the disk-like recording medium 5 and the pickup 75 (see FIG. 4) and the information about a clearance between the light spot and the pit sequence are fed to a pickup driving circuit (not shown, described later) provided to the control portion 35 (see FIG. 3). This pickup driving circuit controls a relative positional relationship between the disk-like recording medium 5 and the pickup 75 (see FIG. 4) in real time based on the information of this positional relationship, so that a stable information reading can be achieved.

More particularly, the tracking coils 90 are driven by the pickup driving circuit based on an output of the light receiving sensor 72 (see FIG. 5) and accordingly the pickup 75 is displaced in the ± directions of the x-axis (L4 direction) such that a position of the pickup 75 is caused in real time to catch up with the tracking error already described (tracking servo). Also, similarly the focus coil 91 is driven by the pickup driving circuit based on the output of the light receiving sensor 72 (see FIG. 5) and accordingly the pickup 75 is displaced in the ± directions of the z-axis (L5 direction) such that a position of the objective lens 74 is caused in real time to catch up with the focus error already described (focus servo).

This control of the pickup driving circuit is applied to keep always a relative positional relationship between the disk-like recording medium 5 and the pickup 75 constant. For example, when the disk-like recording medium 5 was loaded with a tilt to the shaft of the spindle motor (see FIG. 3) that turns/drives this recording medium, a distance between the recording surface of the disk-like recording medium 5 and the pickup 75 is always varied in the ± directions of the z-axis along with the turn of the disk-like recording medium 5. As a result, the shape of the light spot formed on the recording surface of the disk-like recording medium 5 is changed and thus a stable reading operation becomes difficult. The pickup driving circuit executes the control that causes the pickup 75 in real time to catch up with a variation in distance in the z-axis direction, i.e., causes the pickup 75 to displace in the ± directions of the z-axis. The range within which the pickup 75 can be driven by the pickup driving circuit in the ± directions of the z-axis is called a "normal operating range" hereinafter.

Also, a clearance between the disk-like recording medium 5 and the pickup 75 can be displaced steadily by providing a predetermined offset to a current value supplied to the focus coil 91. In this manner, the information recorded in respective layers of the information recording medium 7 having a plurality of recording layers can be read by controlling positively a focal position (depth direction) of the objective lens 74 arranged in the pickup 75.

The pickup 75 in the actuator 73 is supported only by four suspension wires 88, and is constructed to displace even when a very weak force is applied to this pickup 75. No mechanism to slide and guide a displacement of the pickup 75 within a normal operating range is provided to this configuration, which brings out the great merit to speed up a responsibility in the tracking servo and the focus servo. Conversely, when the pickup 75 is subjected to a large impact force when the information reproducing device 1 (see FIG. 1) is dropped, or the like, such pickup 75 is displaced to exceed a normal operating range very easily. When the pickup 75 is displaced to exceed a normal operating range in the + direction of the z-axis, the suspension wires 88 cause the buckling deformation that acts as a cause of the failure such as a defective operation of the actuator 73, or the like.

Figure 7:
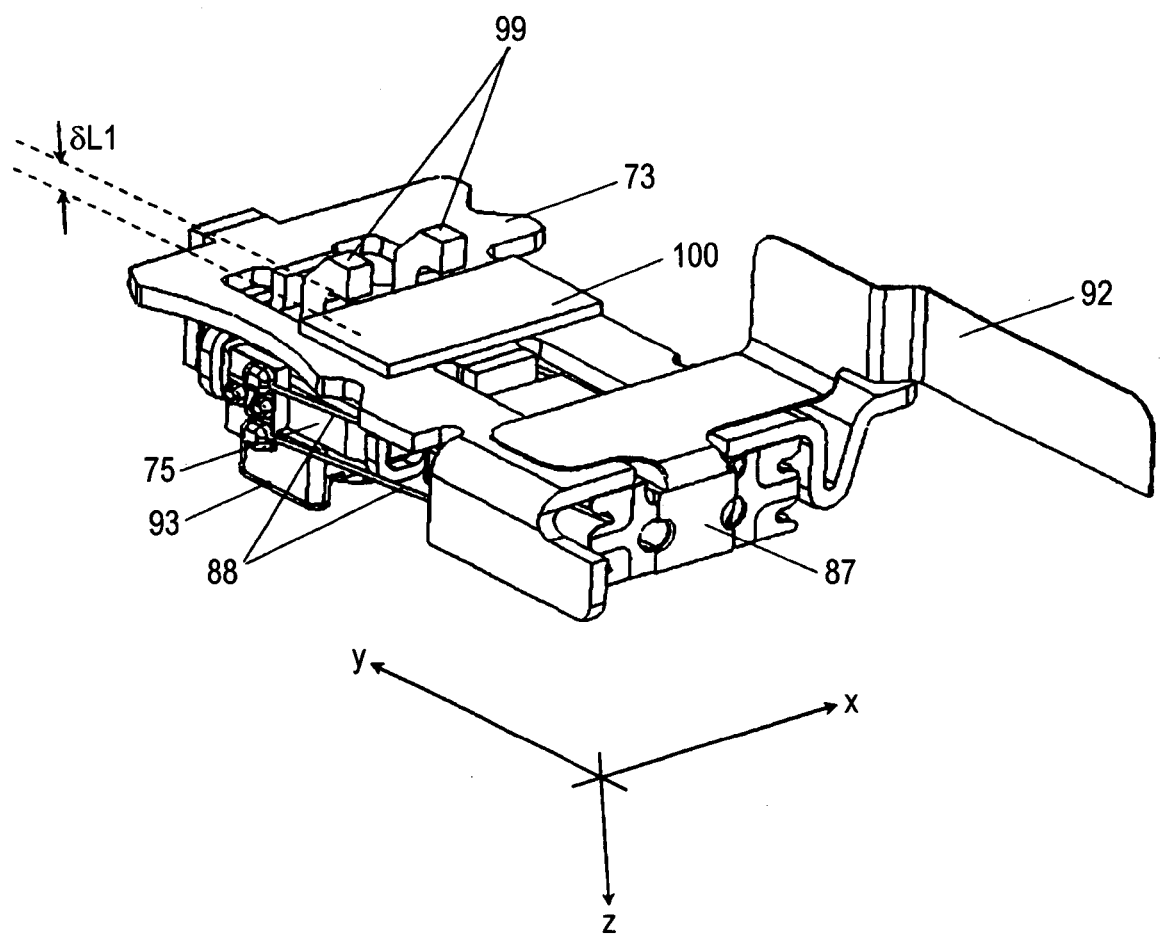
FIG. 7 is a perspective view showing the configuration of the actuator in Embodiment 1 when viewed from a − direction on the z-axis to a + direction on the z-axis.

FIG. 7 is a perspective view showing the configuration of the actuator 73 in Embodiment 1 of the present invention when viewed from the − direction of the z-axis to the + direction of the z-axis. A structure of the actuator 73 will be explained in more detail with reference to FIG. 7 hereunder.

In FIG. 7, 99 is a pickup restraining claw that is provided to the pickup 75. The pickup restraining claws 99 are provided to project from the actuator 73 toward the opposite side to the side on which the pickup 75 is supported by the suspension wires 88. Also, 100 is a stopper that is made of a resin to restrict a displacement of the pickup restraining claws 99 in the + direction of the z-axis.

As shown in FIG. 7, a displacement of the pickup 75, which exceeds a normal operating range in the + direction of the z-axis, is restricted by an interval $\delta L1$ provided between the pickup restraining claws 99 and the stopper 100. Also, a displacement of the pickup 75, which exceeds a normal operating range in the − direction of the z-axis, is restricted by a clearance provided between a main body of the actuator 73 and a bottom portion of the pickup 75 (surface to which the pickup restraining claws 99 are provided). In addition, a displacement of the pickup 75, which exceeds a normal operating range in the ± directions of the x-axis, is restricted by a clearance provided between the actuator 73 and the pickup restraining claws 99 in the ± directions of the x-axis. In this case, the ± directions of the y-axis correspond to the tensile direction and the contractive direction of the suspension wires 88. Since a substantial rigidity of the pickup 75 is very high, such a situation can be ignored that the pickup 75 is displaced in this y-axis direction.

As explained with reference to FIG. 6, since a position of the pickup 75 must be controlled in real time to follow up the tracking error and the focus error, a weight reduction of the pickup 75 is a very important point to ensure the servo performance. Therefore, the pickup restraining claws 99 provided directly to the pickup 75 are restricted by weight, and it is difficult to give them the enough strength to endure the impact applied from the outside. In some case a deformation, a failure, or the like of the pickup restraining claws 99 is caused when a drop test, or the like is applied repeatedly, and then the pickup restraining claws 99 can no longer carry out its proper function of restraining a displacement of the pickup 75 that exceeds a normal operating range.

Figure 8:
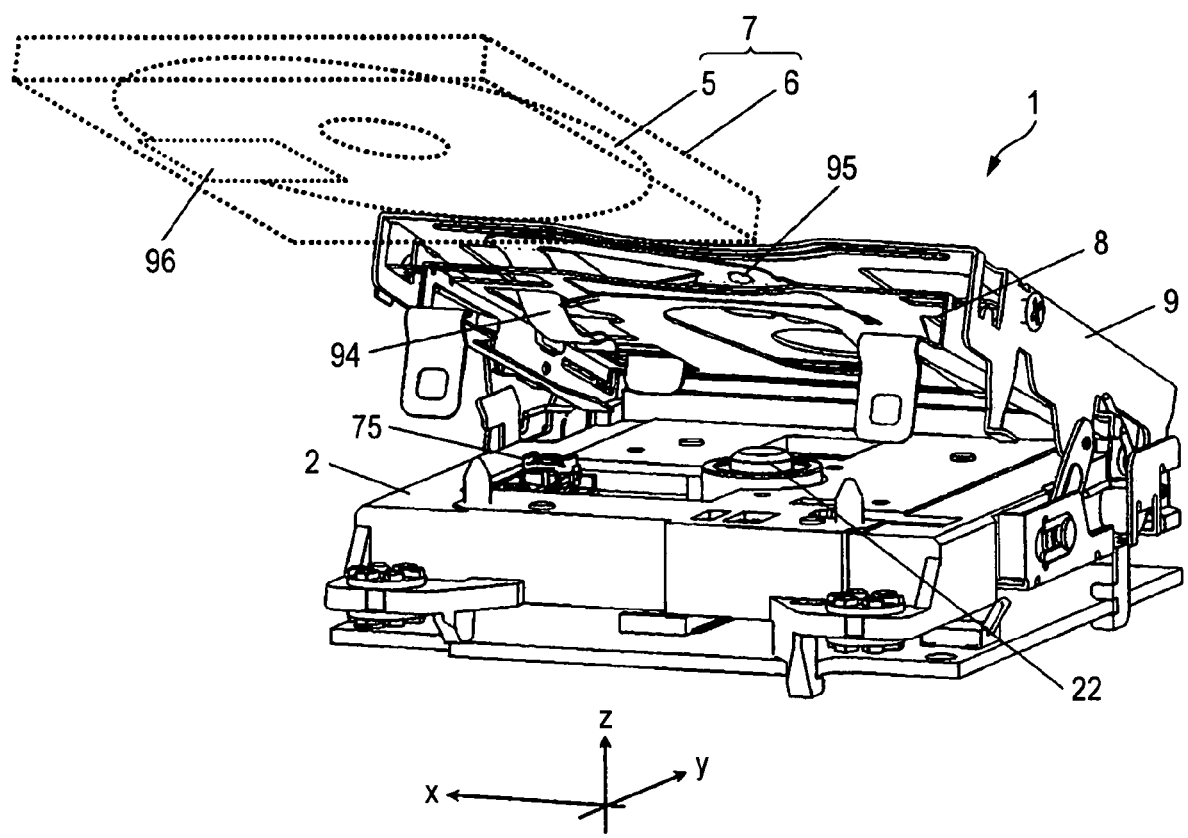
FIG. 8 is a perspective view showing the information reproducing device in Embodiment 1 when an information recording medium housing portion is set to its open state.

FIG. 8 is a perspective view showing the information reproducing device 1 in Embodiment 1 of the present invention when the information recording medium housing portion 8 is set to its open state. A structure of the pickup restrainer for restraining a displacement that exceeds a normal operating range of the pickup 75 in Embodiment 1 of the present invention will be explained hereunder. In FIG. 8, the upper surface cover 3, the upper surface cover open lever, etc. (all see FIG. 2) are omitted from the information reproducing device 1.

In FIG. 8, 94 is a pickup restrainer that is fixed to the upper surface chassis 9 of the information reproducing device 1 by a fitting portion 95, is made of SUS having a thickness of about 0.1 mm, and has a tongue-like shape. As shown in FIG. 8, the information reproducing device 1 in Embodiment 1 has the information recording medium housing portion 8 for housing the information recording medium 7 therein to detachably attach, the pickup 75 for reading the information recorded on at least the information recording medium 7, and the pickup restrainer 94 for restraining a displacement that exceeds a normal operating range of the pickup 75. This pickup restrainer 94 is constructed to displace in answer to loading/unloading of the information recording medium 7 into/from the information recording medium housing portion 8. The pickup restrainer 94 is displaced to occur an elastic deformation in response to the loading of the information recording medium 7, as explained in detail later.

In loading the information recording medium 7 into the information reproducing device 1, the user inserts it manually. In the course of the loading of the information recording medium 7 into the information recording medium housing portion 8, a shutter member 96 provided to the information recording medium 7 is caught on a claw member (not shown) provided to the information recording medium housing portion 8 such that the recording surface of the disk-like recording medium 5 constituting the information recording medium 7 is exposed toward the pickup 75.

Figure 9:
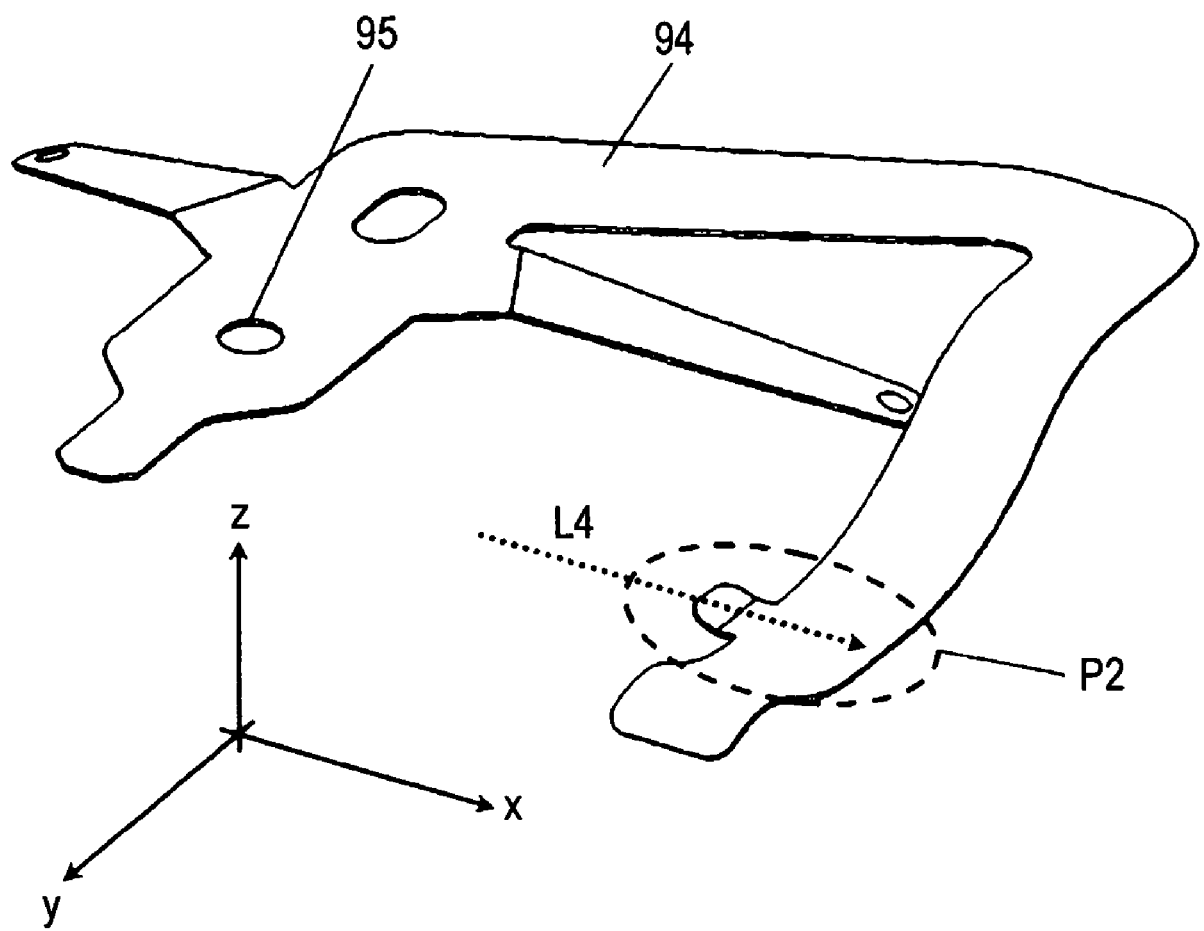
FIG. 9 is a perspective view showing a shape of a pickup restrainer in Embodiment 1.

FIG. 9 is a perspective view showing a shape of the pickup restrainer 94 in Embodiment 1 of the present invention. A shape of the pickup restrainer 94 will be explained in detail with reference to FIG. 9 together with FIG. 8 hereunder.

As shown in FIG. 9, the pickup restrainer 94 in Embodiment 1 has such a structure that its end portion in a position P2 opposing to the pickup 75 in the − direction of the x-axis is bent toward the + direction of the z-axis.

The reason for this structure will be explained hereunder. As shown in FIG. 8, the pickup restrainer 94 is arranged in an end position of the information reproducing device 1 in the + direction of the x-axis (i.e., the outer peripheral direction of the disk). As described later, as soon as the control portion (not shown) senses that the information recording medium housing portion 8 is opened, the pickup 75 is carried to the position where the pickup restrainer 94 is provided (for example, the pickup 75 is carried in the + direction of the x-axis when the pickup 75 is positioned in vicinity of the spindle motor 22). At this time, such a situation is assumed that the pickup 75 collides with the pickup restrainer 94 by this carriage under condition the information recording medium 7 is not loaded into the information recording medium housing portion 8 (for example, an opening action of the information recording medium housing portion 8 is stopped halfway and then this housing portion 8 is closed at once). The pickup restrainer 94 can reduce the damage of the pickup 75 caused by the collision to the lowest minimum if the above bent portion is provided to the collision position. In other words, the pickup restrainer 94 as an elastic member made of a metal such as SUS, or the like is displaced in the + direction of the z-axis and also the carried pickup 75 gets under the pickup restrainer 94 (the − direction of the z-axis) in the situation that the pickup 75 when carried on the L4 line in the + direction of the x-axis is going to collide with the pickup restrainer 94, so that it is impossible for the pickup 75 not to receive the strong impact force in the x-axis direction. In order to make this function more effective, it is desirable that a treatment such as a Teflon (registered trademark) treatment, for example, to reduce a sliding friction should be applied to a surface of the above bent portion. Also, it is further desirable that the treatment to reduce the sliding friction should be applied to at least a portion, which may contact the pickup 75, of the area indicated as the position P2.

Figure 10:
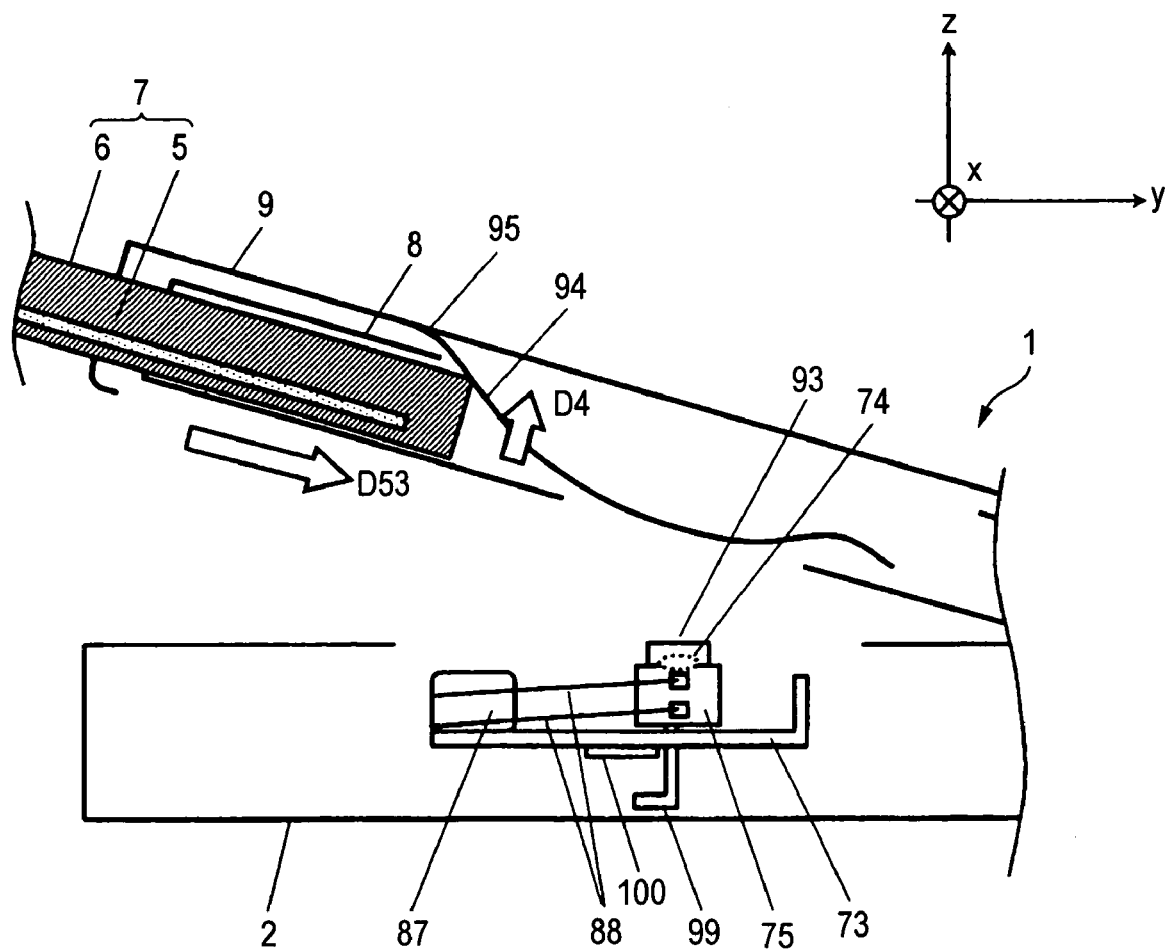
FIG. 10 is a sectional view showing a state of the information reproducing device when an insertion of an information recording medium into the information recording medium housing portion is started in Embodiment 1.

FIG. 10 is a sectional view showing a state of the information reproducing device 1 when an insertion of the information recording medium 7 into the information recording medium housing portion 8 is started in Embodiment 1 of the present invention. A displacement of the pickup restrainer 94 following upon the insertion of the information recording medium 7 into the information recording medium housing portion 8 will be explained in detail with reference to FIG. 10 hereunder.

As already explained, the information recording medium 7 is composed of the cartridge 6, and the disk-like recording medium 5 housed in the cartridge 6. In the information reproducing device 1 in Embodiment 1, as shown in FIG. 10, the pickup restrainer 94 for restraining a displacement that exceeds a normal operating range of the pickup 75 is constructed to displace by the outer peripheral end of the cartridge 6 on the insertion side.

When the cartridge 6 is inserted into the information recording medium housing portion 8 in the D3 direction, the outer peripheral end of the cartridge 6 on the insertion side comes into contact with the tongue-like pickup restrainer 94 following upon this insertion (FIG. 10 shows a state of the information reproducing device 1 at this point of time). Also, the information recording medium 7 is inserted in the D3 direction, the pickup restrainer 94 is pushed up by the outer peripheral end of the cartridge 6 on the insertion side in the D4 direction. That is, the pickup restrainer 94 is displaced in response to the insertion of the information recording medium 7 into the information recording medium housing portion 8 to go away from the pickup 75. Conversely, when the inserted information recording medium 7 is taken out of the information recording medium housing portion 8, the pickup restrainer 94 is displaced to come closer to the pickup 75 with the removal of the information recording medium 7. Also, the displacing direction of the pickup restrainer 94 caused when the information recording medium 7 is loaded/unloaded is the direction equivalent to a normal direction to the recording surface of the information recording medium 7 (the D4 direction and its opposite direction). Since the pickup restrainer 94 is caused to displace in the normal direction to the recording surface of the information recording medium 7, the pickup restrainer 94 is pushed to a clearance between the information recording medium housing portion 8 and the upper surface chassis 9 after the information recording medium 7 is inserted. Therefore, the information reproducing device 1 can be constructed in a compact way without provision of a dedicated space for the pickup restrainer 94 (see FIG. 11).

Here, when the information reproducing device 1 is shocked by the drop, or the like in a state shown in FIG. 10, the situation that the pickup 75 is displaced to exceed a normal operating range is restrained by the pickup restraining claw 99 and the stopper 100 explained with reference to FIG. 7.

Figure 11:
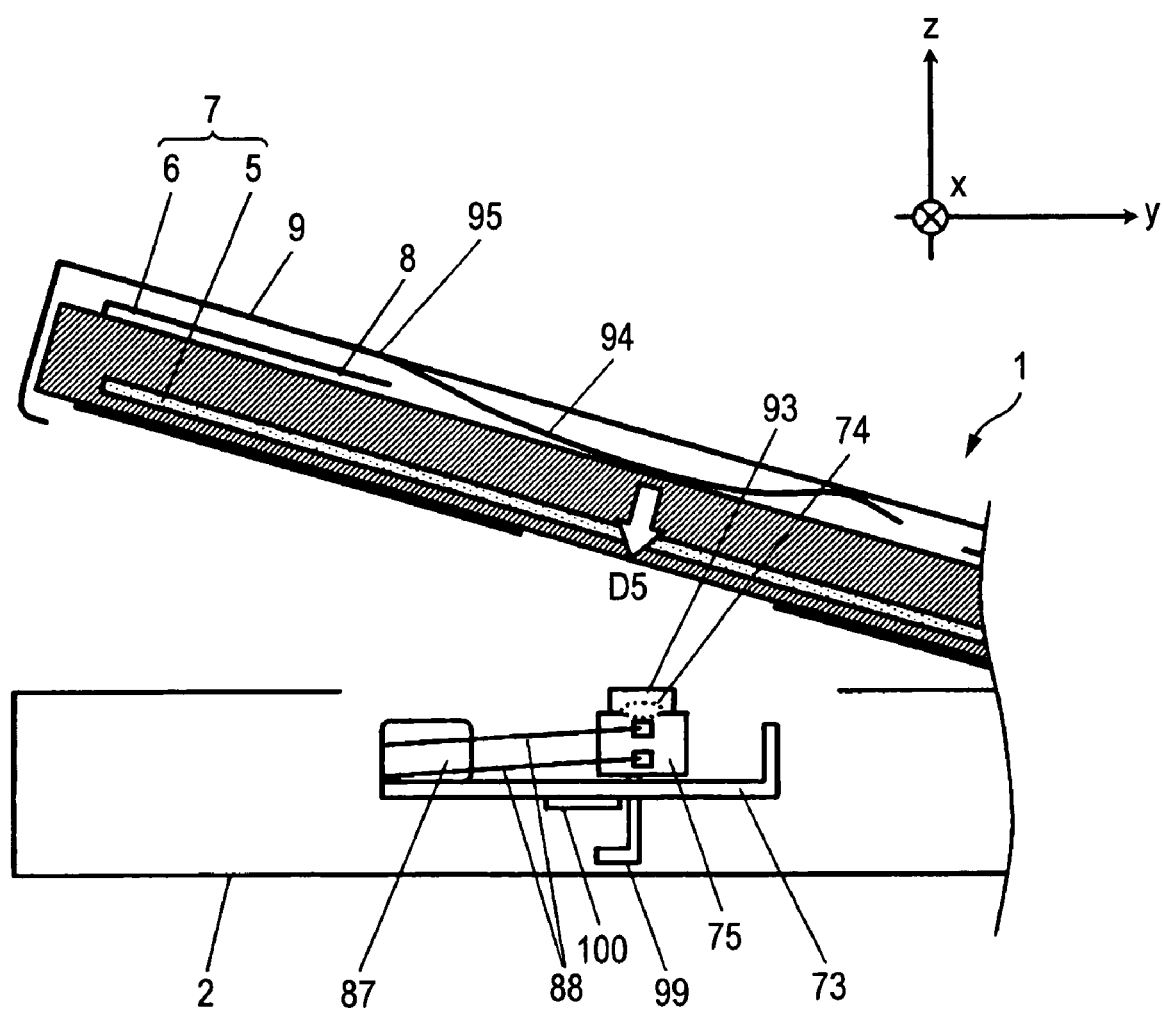
FIG. 11 is a sectional view showing a state of the information reproducing device when the insertion of the information recording medium into the information recording medium housing portion is completed in Embodiment 1.

FIG. 11 is a sectional view showing a state of the information reproducing device 1 when the insertion of the information recording medium 7 into the information recording medium housing portion 8 is completed in Embodiment 1 of the present invention. A displacement state of the pickup restrainer 94 and a state of the information recording medium 7 when the insertion of the information recording medium 7 into the information recording medium housing portion 8 is completed will be explained with reference to FIG. 11 hereunder.

The pickup restrainer 94 finishes its elastic displacement by the outer peripheral end of the cartridge 6 at a point of time when the insertion of the information recording medium 7 into the information recording medium housing portion 8 is completed. At this time, the pickup restrainer 94 acts to energize the information recording medium 7 to the information recording medium housing portion 8 in the D5 direction and then restrain a motion of the information recording medium 7 from its predetermined housing position in the D5 direction and its opposite direction. In other words, the pickup restrainer 94 in Embodiment 1 acts as a position restrainer for the information recording medium 7 at a point of time when the insertion of the information recording medium 7 is completed.

Here, the information recording medium 7 is loaded/unloaded while rubbing against the pickup restrainer 94. At this time, if a friction between the outer peripheral surface of the cartridge 6 and the pickup restrainer 94 is large, the user's operation to load/unload the information recording medium 7 cannot be made smoothly. Therefore, it is desirable that the treatment such as the Teflon (registered trademark) treatment, for example, to reduce a sliding friction should be applied to a surface of the pickup restrainer 94. Also, for the same reason, it is further desirable that the treatment such as the Teflon treatment, or the like to reduce the sliding friction should be applied to a portion, to which the information recording medium 7 is energized by the pickup restrainer 94 in the D5 direction, the information recording medium housing portion 8.

Here, when the information reproducing device 1 is shocked by the drop, or the like in a state shown in FIG. 11, the situation that the pickup 75 is displaced to exceed a normal operating range is restrained by the pickup restraining claw 99 and the stopper 100 explained with reference to FIG. 7.

Figure 12:
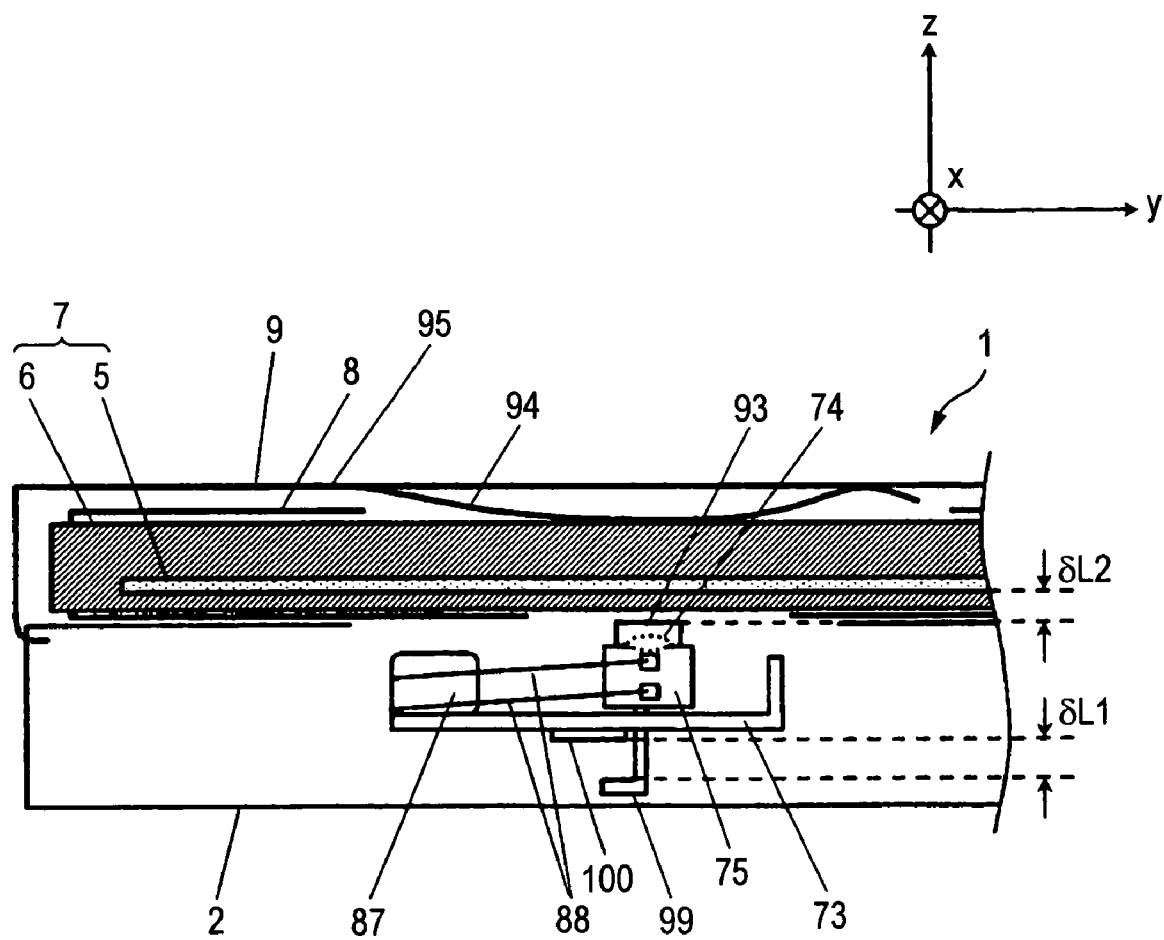
FIG. 12 is a sectional view showing a state of the information reproducing device when the information recording medium housing portion is set to its close state after the insertion of the information recording medium into the information recording medium housing portion is completed in Embodiment 1.

FIG. 12 is a sectional view showing a state of the information reproducing device 1 when the information recording medium housing portion 8 is set to its close state after the insertion of the information recording medium 7 into the information recording medium housing portion 8 is completed in Embodiment 1 of the present invention. A protecting mechanism of the pickup 75 when the information recording medium 7 is inserted into the information recording medium housing portion 8 and then the information recording medium housing portion 8 is closed will be explained with reference to FIG. 12 hereunder.

When an impact is applied to the information reproducing device 1 in a state shown in FIG. 12 and a displacement in the ± directions of the z-axis occurs in the pickup 75, this pickup 75 is moved in the + direction of the z-axis and runs against the recording surface of the disk-like recording medium 5. In this case, the projection portion 93 that is provided to the pickup 75 and formed of an elastic resin that is softer than the disk-like recording medium 5, as explained with reference to FIG. 6, comes into contact with the recording surface of the disk-like recording medium 5 and thus a shock is absorbed.

At this time, the projection portion 93 is constructed to project toward a closer position to the recording surface of the information recording medium 7 than the objective lens 74. Therefore, such a disadvantage is not caused that either of the objective lens 74 and the disk-like recording medium 5 is injured by the collision of the disk-like recording medium 5.

In contrast, when the pickup 75 is displaced in the − direction of the z-axis, the lower surface of the pickup 75 runs into the actuator 73. Since the actuator 73 is made of a metal because it needs a predetermined magnetic permeability, as already explained, such actuator 73 does not absorb an impact caused by the collision of the pickup 75. However, the impact applied to the pickup 75 is absorbed by the shock absorbing action of the projection portion 93 and the elasticity of the suspension wires 88 that support the pickup 75 while the pickup 75 reciprocatingly oscillates between the disk-like recording medium 5 and the actuator 73 by the impact.

In FIG. 12, $\delta L2$ also indicates an interval between the projection portion 93 and the recording surface of the disk-like recording medium 5. It is desirable that the interval $\delta L1$ provided between the pickup restraining claws 99 and the stopper 100, as already explained with reference to FIG. 7, and this interval $\delta L2$ should be set to satisfy a relationship of $\delta L1 > \delta L2$. If this relationship is satisfied, the projection portion 93 provided to the pickup 75 comes into contact with the recording surface of the disk-like recording medium 5 before the pickup restraining claw 99 comes into contact with the stopper 100. Therefore, in case the information recording medium housing portion 8 is set to its close state after the insertion of the information recording medium 7 into the information recording medium housing portion 8 is completed, a displacement of the pickup 75 to exceed a normal operating range is restrained because only the projection portion 93 contacts the recording surface of the disk-like recording medium 5. Accordingly, such a situation is eliminated that a burden is always imposed on the pickup restraining claw 99 and the stopper 100, the reliability of the information reproducing device 1 to the impact caused by the drop, or the like can be improved highly.

Now, in the case shown in FIG. 12, when a force is applied to the pickup 75 in the ± directions of the z-axis, a displacement exceeding a normal operating range of the pickup 75 is restrained because the pickup restraining claw 99 comes into touch with the actuator 73, as explained with reference to FIG. 7.

Figure 13:
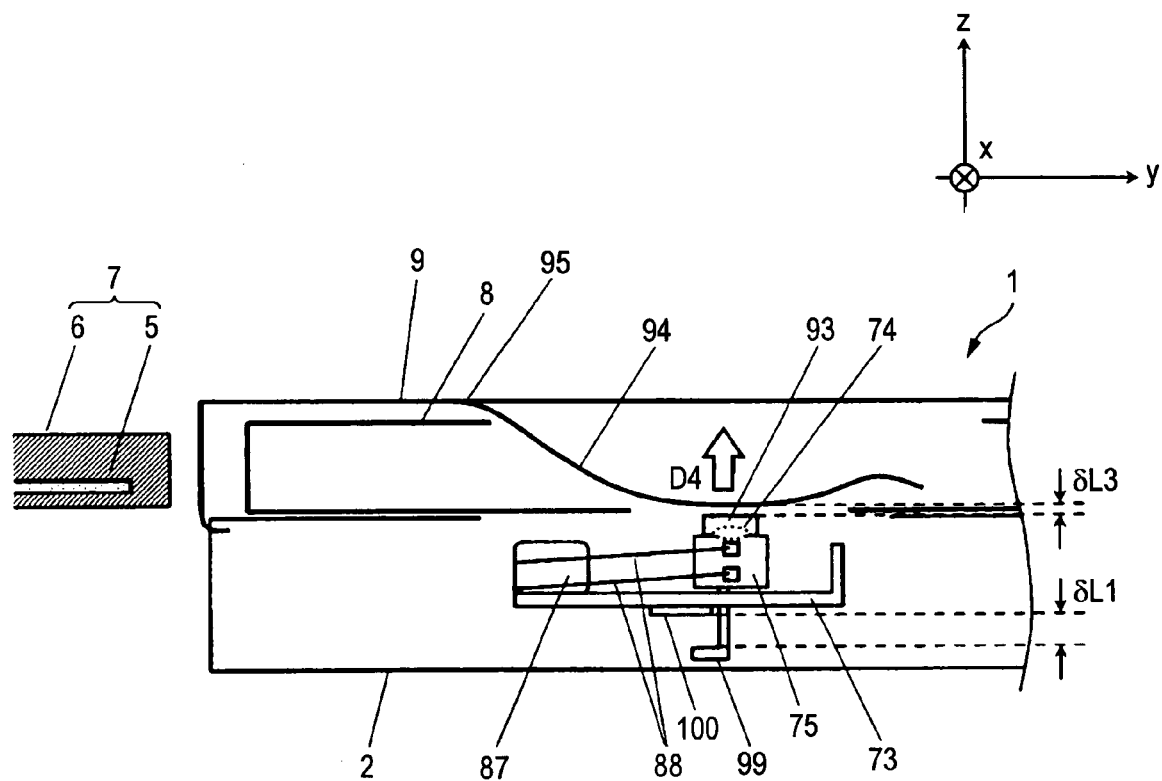
FIG. 13 is a sectional view showing a state of the information reproducing device when the information recording medium housing portion is set to its close state while the information recording medium is removed from the information recording medium housing portion in Embodiment 1.

FIG. 13 is a sectional view showing a state of the information reproducing device 1 when the information recording medium housing portion 8 is set to its close state while the information recording medium 7 is removed from the information recording medium housing portion 8 in Embodiment 1 of the present invention. A protecting mechanism of the pickup 75 when the information recording medium 7 is removed from the information recording medium housing portion 8 and then the information recording medium housing portion 8 is closed will be explained with reference to FIG. 13 hereunder.

In FIG. 13, the pickup restrainer 94 displaced in answer to the unloading of the information recording medium 7 is placed a predetermined distance away from at least a part of the pickup 75 to absorb the impact that pickup 75 gets.

More particularly, the information reproducing device 1 shown in FIG. 12 and FIG. 13 has the information recording medium housing portion 8 for housing the detachably attached information recording medium 7 therein, the pickup 75 for reading the information recorded on at least the information recording medium 7, and the pickup restrainer 94 for restraining a displacement exceeding a normal operating range of the pickup 75. The pickup restrainer 94 restrains a displacement of the pickup 75 in a state that the information recording medium 7 is unloaded from the information recording medium housing portion 8, while the recording surface of the information recording medium 7 restrains a displacement of the pickup 75 in a state that the information recording medium 7 is loaded into the information recording medium housing portion 8.

Also, in the information reproducing device 1 shown in FIG. 12 and FIG. 13, the pickup 75 contains the objective lens 74 that focuses a light at least on the recording surface of the information recording medium 7. The projection portion 93 projected toward the direction of the recording surface of the information recording medium 7 is provided in vicinity of the pickup restrainer 94. When the pickup 75 gets the impact, the projection portion 93 comes in contact with the pickup restrainer 94 or the recording surface of the information recording medium 7.

As shown in these Figures, the projection portion 93 is constructed to project to a position that is closer to the recording surface of the information recording medium 7 than the objective lens 74.

More particularly, in a state shown in FIG. 13, when the impact is applied to the information reproducing device 1 and a displacement in the ± directions of the z-axis occurs in the pickup 75, the pickup 75 displaces in the + direction of the z-axis and collides with the pickup restrainer 94. In this case, the projection portion 93 that is provided to the pickup 75 explained with reference to FIG. 6 and is made of an elastic resin that is softer than at least the disk-like recording medium 5 comes into contact with the pickup restrainer 94, and the impact is absorbed. In addition, because the pickup restrainer 94 is the tongue-like member made of a thin metal having a thickness of about 0.1 mm, as already described, this pickup restrainer 94 is infinitesimally displaced in the D4 direction by the collision of the pickup 75 and can absorb the impact caused by the collision of the pickup 75.

In contrast, when the pickup 75 is displaced in the − direction of the z-axis, the lower surface of the pickup 75 collides with the actuator 73. Since the actuator 73 is made of a metal because it needs a predetermined magnetic permeability, as already explained, such actuator 73 does not absorb the impact caused by the collision of the pickup 75 at that time. However, the impact applied to the pickup 75 is absorbed by the shock absorbing action generated by a synergistic effect of the projection portion 93 and the pickup restrainer 94 and the elasticity of the suspension wires 88 that support the pickup 75 while the pickup 75 reciprocatingly oscillates between the disk-like recording medium 5 and the actuator 73 by the impact.

In FIG. 13, δL3 also indicates an interval between the projection portion 93 and the pickup restrainer 94. It is desirable that the interval δL1 provided between the pickup restraining claws 99 and the stopper 100, as already explained with reference to FIG. 7, and this interval δL3 should be set to satisfy a relationship of δL1>δL3. If this relationship is satisfied, the projection portion 93 provided to the pickup 75 comes into contact with the pickup restrainer 94 before the pickup restraining claw 99 comes into contact with the stopper 100. Therefore, in case the information recording medium housing portion 8 is set to its close state after the information recording medium 7 is taken out of the information recording medium housing portion 8, a displacement of the pickup 75 to exceed a normal operating range is restrained because only the projection portion 93 contacts the pickup restrainer 94. Accordingly, such a situation is eliminated that a burden is always imposed on the pickup restraining claw 99 and the stopper 100, the reliability of the information reproducing device 1 to the impact caused by the drop, or the like can be improved highly.

Now, in the case shown in FIG. 13, when a force is applied to the pickup 75 in the ± directions of the x-axis, a displacement exceeding a normal operating range of the pickup 75 is restrained because the pickup restraining claw 99 comes into touch with the actuator 73, as explained with reference to FIG. 7.

Figure 14:
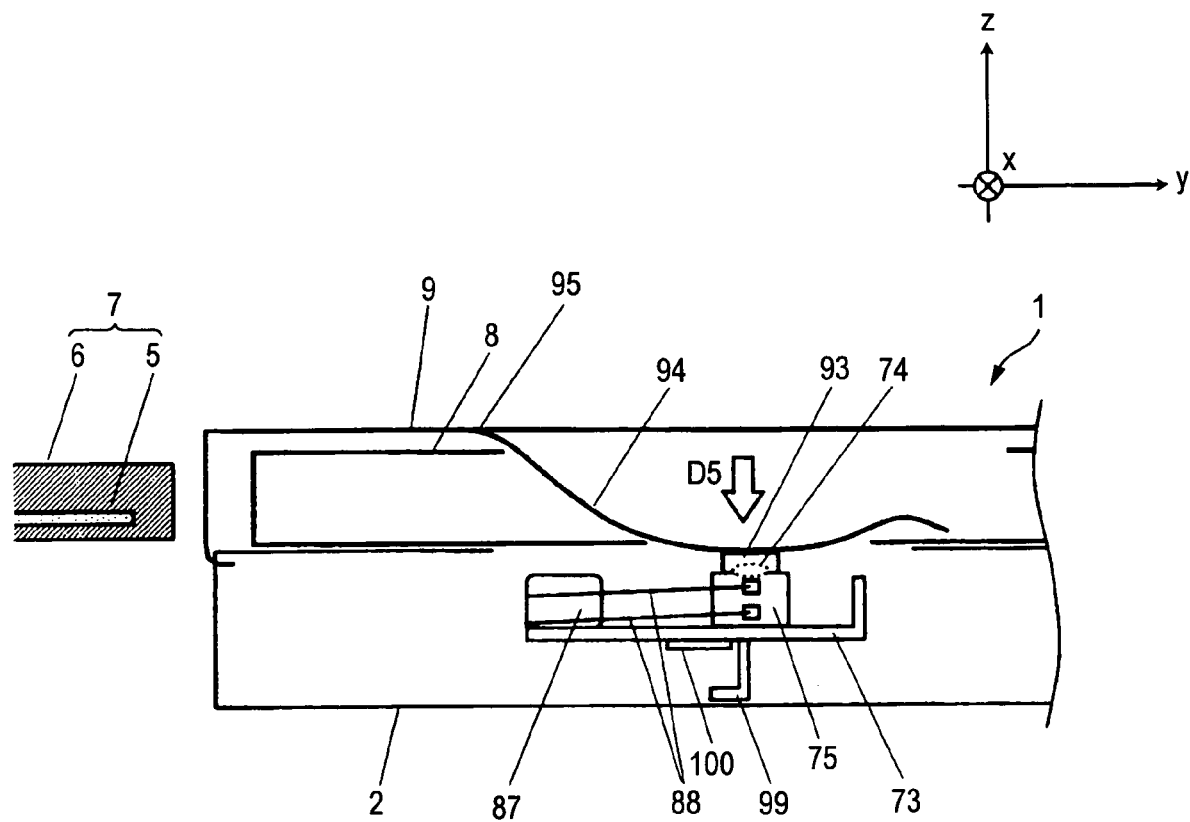
FIG. 14 is a sectional view showing a state of the information reproducing device when the information recording medium housing portion is set to its close state while the information recording medium is removed from the information recording medium housing portion in Embodiment 1.

FIG. 14 is a sectional view showing a state of the information reproducing device 1 when the information recording medium housing portion 8 is set to its close state while the information recording medium 7 is removed from the information recording medium housing portion 8 in Embodiment 1 of the present invention. A protecting mechanism of the pickup 75 when the information recording medium 7 is removed from the information recording medium housing portion 8 and then the information recording medium housing portion 8 is closed will be explained with reference to FIG. 13 hereunder. A structure shown in FIG. 14 is different from that shown in FIG. 13 in that the pickup restrainer 94 that displaces in answer to the unloading of the information recording medium 7 is constructed to contact at least a part of the pickup 75, i.e., the projection portion 93 and absorb an impact that the pickup 75 underwent.

In a state shown in FIG. 14, when the impact is applied to the information reproducing device 1 and a force is applied to the pickup 75 to displace in the ± directions of the z-axis, the pickup 75 is pushed elastically against a bottom surface of the actuator 73 by the pickup restrainer 94 that has come into contact with the projection portion 93. Therefore, the pickup 75 never displaces in the ± directions of the z-axis. Even if an impact force applied to the information reproducing device 1 is very large and the pickup 75 is caused to displace in the + direction of the z-axis, an amount of displacement is very small and also the impact applied to the pickup 75 is absorbed immediately by the pickup restrainer 94.

Now, a configuration shown in FIG. 14 can restrain a displacement that exceeds a normal operating range of the pickup 75 even when a force is applied to the pickup 75 in the ± directions of the z-axis. The pickup 75 is energized in the D5 direction by the pickup restrainer 94 as illustrated, and as a result the pickup 75 is pushed against the actuator 73. In this state, because a friction is generated between the pickup 75 and the actuator 73 in the ± directions of the x-axis, the pickup 75 is hard to displace in the ± directions of the x-axis. Since a braking force is generated by this friction in the ± directions of the x-axis before the pickup restraining claw 99 comes into contact with the actuator 73, this configuration can achieve a very great effect from a point of view to disperse the load applied to the pickup restraining claw 99.

Figure 15:
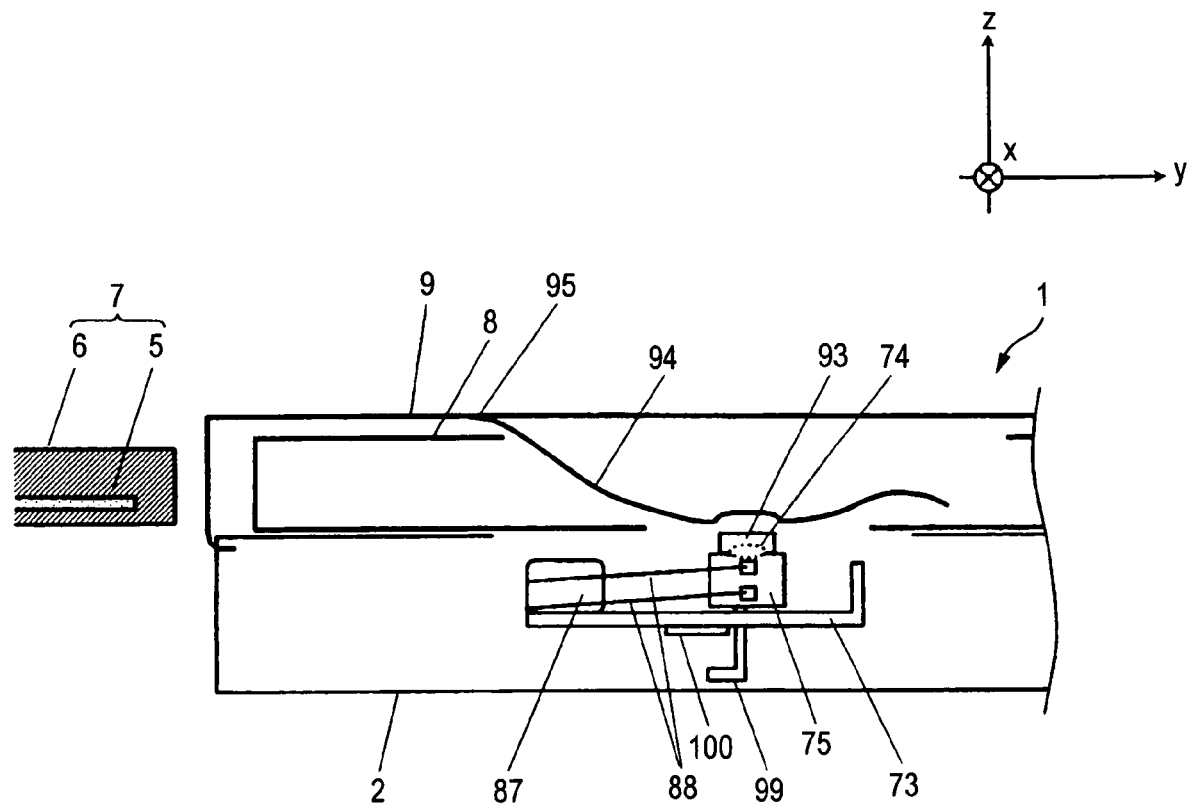
FIG. 15 is a sectional view showing a state of the information reproducing device when the information recording medium housing portion is set to its close state while the information recording medium is removed from the information recording medium housing portion in Embodiment 1.

FIG. 15 is a sectional view showing a state of the information reproducing device 1 when the information recording medium housing portion 8 is set to its close state while the information recording medium 7 is removed from the information recording medium housing portion 8 in Embodiment 1 of the present invention. A protecting mechanism of the pickup 75 when the information recording medium 7 is removed from the information recording medium housing portion 8 and then the information recording medium housing portion 8 is closed will be explained with reference to FIG. 15 hereunder. A structure shown in FIG. 15 is similar to that shown in FIG. 13 in that the pickup restrainer 94 that displaces in answer to loading/unloading of the information recording medium 7 is constructed such that this member is arranged away from at least a part of the pickup 75 by a predetermined interval to absorb an impact that the pickup 75 underwent. In this case, a sectional shape of the pickup restrainer 94 in FIG. 15 is not a simple tongue shape, and the pickup restrainer 94 has a groove portion in a position opposing to the pickup 75 in the direction that goes away from the pickup 75. The reason why this groove portion is provided will be explained hereunder.

As shown in FIG. 8, the pickup restrainer 94 is provided to the end portion of the information reproducing device 1 in the + direction of the x-axis (i.e., the outer peripheral direction of the disk). As described later, as soon as the control portion (not shown) senses that the information recording medium housing portion 8 is opened, such control portion carries the pickup 75 to a position at which the pickup restrainer 94 is provided. At that time, such a situation can be assumed that the pickup 75 runs into the pickup restrainer 94 by this carriage in a condition that the information recording medium 7 is not loaded into the information recording medium housing portion 8. Therefore, in order to reduce the damage of the pickup 75 to the lowest minimum even when the collision occurs, a groove portion is provided to the pickup restrainer 94 in a position that opposes to the pickup 75. As a sectional shape of the pickup restrainer 94, the structure of the bent portion P2 shown in FIG. 9 may be employed in combination.

Figure 16:
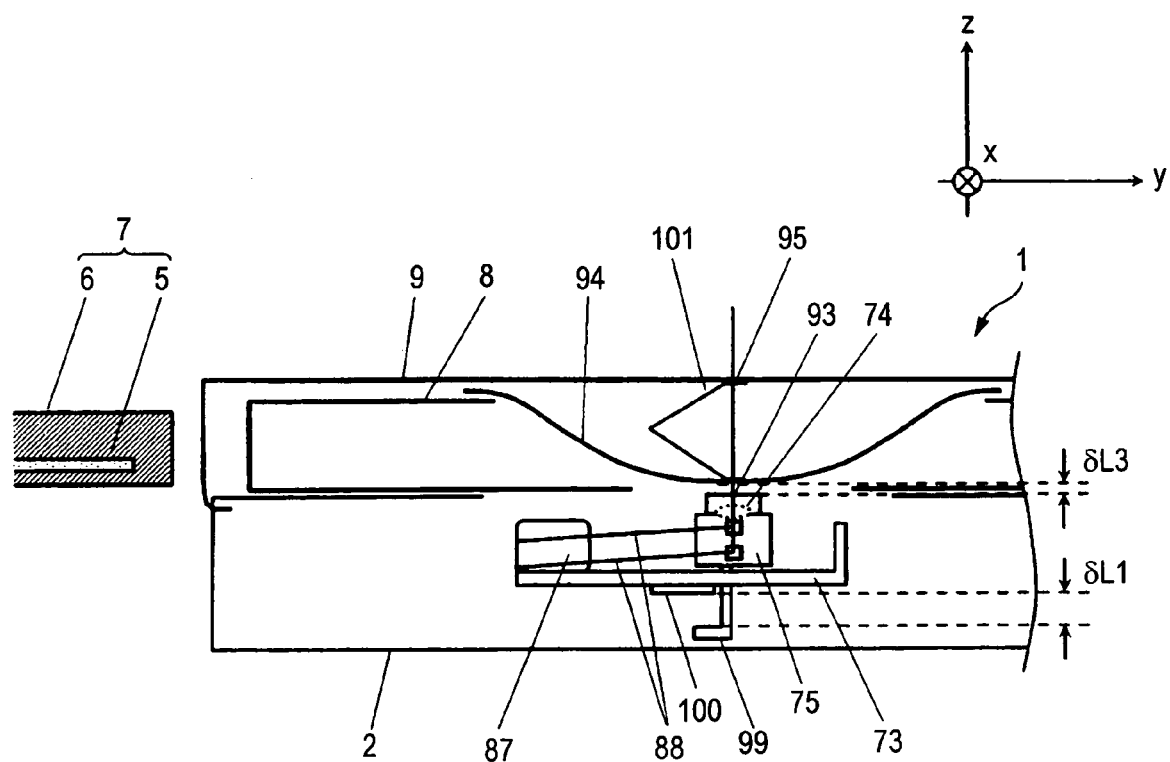
FIG. 16 is an explanatory view showing another preferred configurative example of a pickup restrainer and its peripheral portion in Embodiment 1.

FIG. 16 is an explanatory view showing another preferred configurative example of the pickup restrainer 94 and its peripheral portion in Embodiment 1 of the present invention.

Since the situation, the effect, etc. of the displacement of the pickup restrainer 94 in answer to loading/unloading of the information recording medium 7 are similar to those already explained with reference to FIG. 10 to FIG. 14, their explanation will be omitted herein.

In FIG. 16, 101 is a leaf spring that is provided to the upper surface chassis 9 in the fitting portion 95 and supports the pickup restrainer 94 in the air. In the device configuration in which a wide space can be provided between the upper surface chassis 9 and the information recording medium housing portion 8, the leaf spring 101 may be replaced with a coil spring or may be replaced with other elastic member. Also, in FIG. 16, δL3 indicates an interval between the projection portion 93 and the pickup restrainer 94. It is desirable that the interval δL1 provided between the pickup restraining claws 99 and the stopper 100 and this interval δL3 should be set to satisfy a relationship of δL1>δL3. In this case, as shown in FIG. 14, such a configuration may be employed that the pickup 75 is pushed against the actuator 73 by the pickup restrainer 94. Also, as shown in FIG. 15, a groove portion may be provided to the pickup restrainer 94 in a position that corresponds to the projection portion 93 provided to the pickup 75. Alternately, as shown in FIG. 9, the bent portion may be added to a part of the pickup restrainer 94.

As described above, Embodiment 1 of the present invention is characterized in that the protecting mechanism of the pickup 75 is differentiated when the information recording medium housing portion 8 is set to its open state (see FIG. 10, FIG. 11) and when the information recording medium housing portion 8 is set to its close state (see FIG. 12, FIG. 13).

First, when the information recording medium housing portion 8 is in its open state, a displacement of the pickup 75 exceeding normal operating ranges in the z-axis direction and the x-axis direction is restrained by the pickup restraining claw 99 provided to the pickup 75 and the stopper 100 provided to the actuator 73.

In contrast, when the information recording medium housing portion 8 is in its close state and the information recording medium 7 is loaded into the information recording medium housing portion 8 (see FIG. 12), a displacement of the pickup 75 exceeding a normal operating range in the z-axis direction is restrained by an interval between the projection portion 93 provided to the pickup 75 and the recording surface of the disk-like recording medium 5 constituting the information recording medium 7. Also, a displacement of the pickup 75 exceeding a normal operating range in the x-axis direction is restrained by an interval in the x-axis direction between the pickup restraining claw 99 provided the pickup 75 and the actuator 73.

In addition, when the information recording medium housing portion 8 is in its close state and the information recording medium 7 is unloaded from the information recording medium housing portion 8 (see FIG. 13), a displacement of the pickup 75 exceeding a normal operating range in the z-axis direction is restrained by an interval between the projection portion 93 provided to the pickup 75 and the pickup restrainer 94. Also, a displacement of the pickup 75 exceeding a normal operating range in the x-axis direction is restrained by an interval in the x-axis direction between the pickup restraining claw 99 provided the pickup 75 and the actuator 73. Also, as a similar configuration to this configuration, when the information recording medium housing portion 8 is in its close state and the information recording medium 7 is unloaded from the information recording medium housing portion 8 and also the pickup 75 is pushed against the actuator 73 by the pickup restrainer 94 (see FIG. 14), a displacement of the pickup 75 exceeding normal operating ranges in the z-axis direction and the x-axis direction is substantially prevented by the pickup restrainer 94.

In this manner, Embodiment 1 of the present invention has such a configuration that a means for restraining a displacement of the pickup 75 exceeding a normal operating range can be differentiated in response to the open/close of the information recording medium housing portion 8 and the loading/unloading of the information recording medium 7 into/from the information recording medium housing portion 8. Accordingly, since the displacement of the pickup 75 exceeding a normal operating range can be restrained to disperse in answer to the state of the information reproducing device 1, the reliability of the information reproducing device 1 can be ensured for a long term without a concentration of the load to the particular restrainer.

Figure 17:
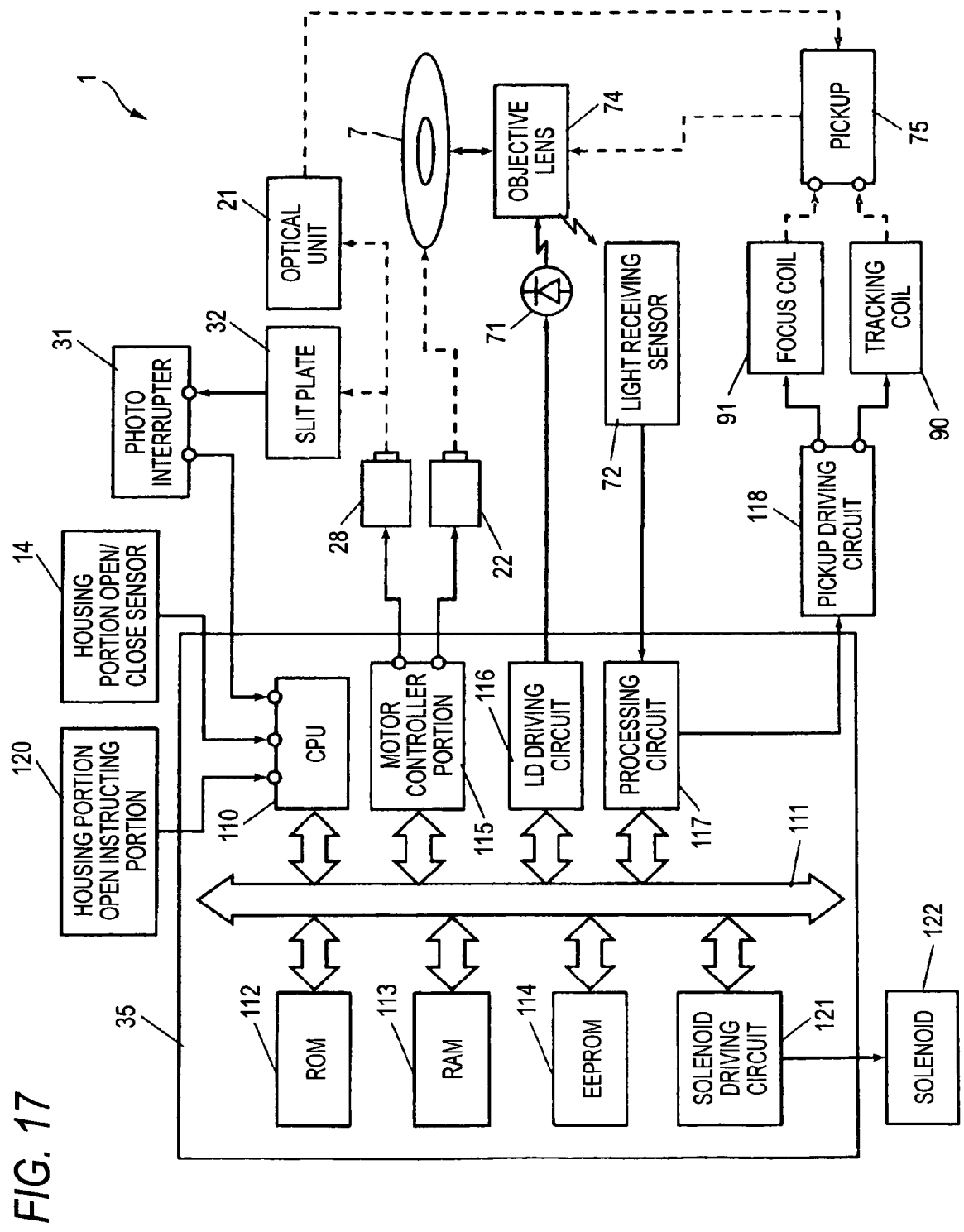
FIG. 17 is a block configurative diagram showing a hardware configuration the information reproducing device in Embodiment 1.

FIG. 17 is a block configurative diagram showing a hardware configuration the information reproducing device 1 in Embodiment 1 of the present invention. In FIG. 17, a solid line to connect the blocks showing individual hardware elements denotes a flow of a signal, and a broken line to connect the same denotes that a mechanism connection is present.

An operation of the information reproducing device 1 will be explained in detail with reference to FIG. 17 as well as FIG. 3 hereunder.

In FIG. 17, 110 is a CPU that is installed into the control portion 35 and controls the setting of control parameters, etc. in connection with the hardware of the information reproducing device 1, the drive of the mechanisms, and the like. The CPU 110 is connected via a bus 111 to a ROM 112 as a nonvolatile memory in which a program is stored, a RAM 113 constituting a work area of the CPU 110, and an EEPROM 114 in which states, and the like of the information reproducing device 1 are saved.

The CPU 110 is connected to a motor controller portion 115 via the bus 111. The CPU 110 causes the motor controller portion 115 to rotate the spindle motor 22 in a predetermined direction, and rotates/drives the information recording medium 7 (more precisely, the disk-like recording medium 5 constituting the information recording medium 7) loaded into the information reproducing device 1. Similarly, causes the motor controller portion 115 to rotate the feed motor 35 in the forward/reverse directions, and drives the optical unit 21 (see FIG. 2) within predetermined inner and outer peripheral moving ranges along the information recording medium 7 via the carriage 70 (see FIG. 4) The actuator 73 (see FIG. 4) is mounted on the optical unit 21 and the pickup 75 is mounted on the actuator 73 (see FIG. 4) The CPU 110 drives the feed motor 28 and consequently transfers the pickup 75 to any position over inner and outer peripheries of the information recording medium 7. Then, when the feed motor 28 is rotated, the slit plate 32 is rotated via gears (not shown) and the lead screw shaft 23 (see FIG. 3) and the photo interrupter 31 senses the slits provided to the slit plate 32 and outputs the result to the CPU 110. An output of the photo interrupter 31 is connected to an interrupt terminal of the CPU 110. Since the CPU 110 counts the output of the photo interrupter 31 every time when the interruption is generated, it can recognize a position of the pickup 75 on the inner and outer peripheries of the information recording medium 7.

Explanation will be continued with reference to FIG. 17 as well as FIG. 2 and FIG. 8 hereunder.

The information reproducing device 1 in Embodiment 1 of the present invention has the retractable information recording medium housing portion 8 (see FIG. 2) for housing the detachably attached information recording medium 7 therein, the pickup 75 for reading at least the information recorded on the recording surface of the information recording medium 7, a carrier (the feed motor 28) for carrying the pickup 75 along the recording surface of the information recording medium 7 housed in the information recording medium housing portion 8 in a predetermined direction, a controller (the CPU 110, the motor controller portion 115) for controlling the carrier, and the pickup restrainer 94 (see FIG. 8) for restraining a displacement of the pickup 75 exceeding a normal operating range. The pickup restrainer 94 (see FIG. 8) is constructed to displace in answer to the loading/unloading of the information recording medium 7. The controller (the CPU 110, the motor controller portion 115) is constructed to control the carrier (the feed motor 28) in response to the open/close of the information recording medium housing portion 8 (i.e., in response to the open/close states of the information recording medium housing portion 8 sensed by the housing portion open/close sensor 14) and carry the pickup 75 to a predetermined position.

The CPU 110 recognizes a relative position of the pickup 75 to an initial position by counting the slits provided to the slit plate 32 while the pickup 75 is reading the information recorded on the information recording medium 7. Therefore, the CPU 110 when senses the open state of the information recording medium housing portion 8 by the housing portion open/close sensor 14 can carry the pickup 75 to a predetermined location within the moving range.

Here, the "predetermined location" mentioned herein is a position that opposes to the pickup restrainer 94, as shown in FIG. 8, and this position corresponds to the outermost end portion out of the moving range of the optical unit 21 in the + direction of the x-axis (a limit position of the moving range of the optical unit 21 in the + direction of the x-axis in FIG. 2) in Embodiment 1. In the position that oppose to the pickup restrainer 94, a displacement of the pickup 75 exceeding a normal operating range is restrained by the pickup restrainer 94, as explained with reference to FIG. 10 to FIG. 14 up to now. This position will be called a "protect position" hereunder.

The control to carry the pickup 75 to the protect position is executed when the open/close state of the information recording medium housing portion 8 being sensed by the sensor for sensing the unloading of the information recording medium 7, i.e., the housing portion open/close sensor 14, indicates the open state.

Here, the carry of the pickup 75 to this protect position is recorded in the EEPROM 114. For example, even when a power supply of the information reproducing device 1 is turned OFF in this state, the CPU 110 can confirm that the pickup 75 has already been carried to the protect position when the power supply of the information reproducing device 1 is turned ON next. Therefore, the CPU 110 never repeat the unnecessary operation.

In this protect position, the user loads or unloads the information recording medium 7 into/from the opened information recording medium housing portion 8, and then brings the information recording medium housing portion 8 into its close state. Since particular means and operations applied to restrain a displacement of the pickup 75 exceeding a normal operating range in these states have already been explained, their explanation will be omitted herein.

Also, 116 is an LD driving circuit. The LD driving circuit 116 contains a driver of the light source 71 constructed by the bluish purple laser diode. The CPU 110 can control a luminous power of the light source 71 by setting a parameter to the LD driving circuit 116.

Also, 117 is a processing circuit. A light emitted from the light source 71 is focused on the recording surface of the disk-like recording medium 5 (see FIG. 8, and the like) constituting the information recording medium 7 by the objective lens 74 via the optical system explained with reference to FIG. 5. This reflected light is received by the light receiving sensor 72. The light receiving sensor 72 constructed by the four-segment sensor, as already explained with reference to FIG. 5, outputs the information about a clearance between the recording surface of the disk-like recording medium 5 and the objective lens 74 and the information about a clearance between the light spot formed on the disk-like recording medium 5 and the recorded pit sequence, in addition to the above recorded information.

Also, 118 is a pickup driving circuit. The information about these clearances are analog-digital converted by the processing circuit 117. The information about the clearance between the disk-like recording medium 5 and the pickup 75 and the information about the clearance between the light spot and the recorded pit sequence are fed to the pickup driving circuit 118. The pickup driving circuit 118 controls a relative positional relationship of the pickup 75 to the disk-like recording medium 5 in real time based on the information indicating the positional relationship to attain a stable information reading.

More particularly, the tracking coils 90 are driven by the pickup driving circuit 118 based on the output of the light receiving sensor 72 and accordingly the pickup 75 is infinitesimally displaced in the inner and outer peripheral directions of the information recording medium 7 (the ± directions of the x-axis) such that the position of the pickup 75 is caused in real time to catch up with the tracking error already described (tracking servo). Also, similarly the focus coil 91 is driven by the pickup driving circuit 118 based on the output of the light receiving sensor 72 and accordingly the pickup 75 is infinitesimally displaced in the emergent direction of the light from the objective lens 74 and its opposite direction (the ± directions of the z-axis) such that the position of the objective lens 74 is caused in real time to catch up with the focus error already described (focus servo).

The above explanation is made under the assumption that the user opens/closes the information recording medium housing portion 8 manually. In the case where the information reproducing device 1 also has a recording function to the information recording medium 7, there exists such a problem that, when the information recording medium housing portion 8 is directly brought into its open state by the user during a recording operation, the recording operation is forcedly stopped at that point of time and thus the information recording on the recording surface of the information recording medium 7 becomes unstable. Therefore, in the information reproducing device 1 having the recording/reproducing functions together, such a configuration is employed that, when the information recording medium housing portion 8 is to be opened, the user pushes an indicator button (not shown) to instruct its open and then the information recording medium housing portion 8 is opened electrically based on the pushing information.

In other words, when the information reproducing device 1 in Embodiment 1 of the present invention is constructed to have also the recording function, it is desirable that an instructing portion for instructing the unloading of the information recording medium 7 (i.e., the open of the information recording medium housing portion 8 (see FIG. 2)) should be provided and then the controller should carry the pickup to a predetermined position based on an output of the instructing portion.

A configuration of the information reproducing device 1 in Embodiment 1 of the present invention to which a recording function is provided will be explained hereunder.

Also, 120 is a housing portion open instructing portion constructed by a microswitch, or the like. An output of the housing portion open instructing portion 120 is input into the CPU 110. When the CPU 110 accepts the instruction from the housing portion open instructing portion 120, it controls the LD driving circuit 116 to stop the drive of the light source 71 and stop the rotation of the spindle motor 22. Then, the CPU 110 causes the feed motor 28 to rotate and carries the pickup 75 (more precisely, the optical unit 21 on which the pickup 75 is mounted) to the outermost portion of the moving range as shown in FIG. 8, i.e., the position opposing to the pickup restrainer 94 (the protect position). It is of course that, when the information to the effect that the pickup 75 has been carried to the protect position is recorded in advance on the EEPROM 114, for example, the CPU 110 by no means carries the pickup 75 to the protect position.

When the pickup 75 is carried to the protect position, the CPU 110 controls a solenoid driving circuit 121 to drive a solenoid 122. Since the hook 11 shown in FIG. 2 is displaced by the solenoid 122 (not shown in FIG. 2) in the D1 direction, the information recording medium housing portion 8 is opened in the D2 direction.

Embodiment 2

Embodiment 2 of the present invention will be explained with reference to the drawings hereinafter.

Figure 18:
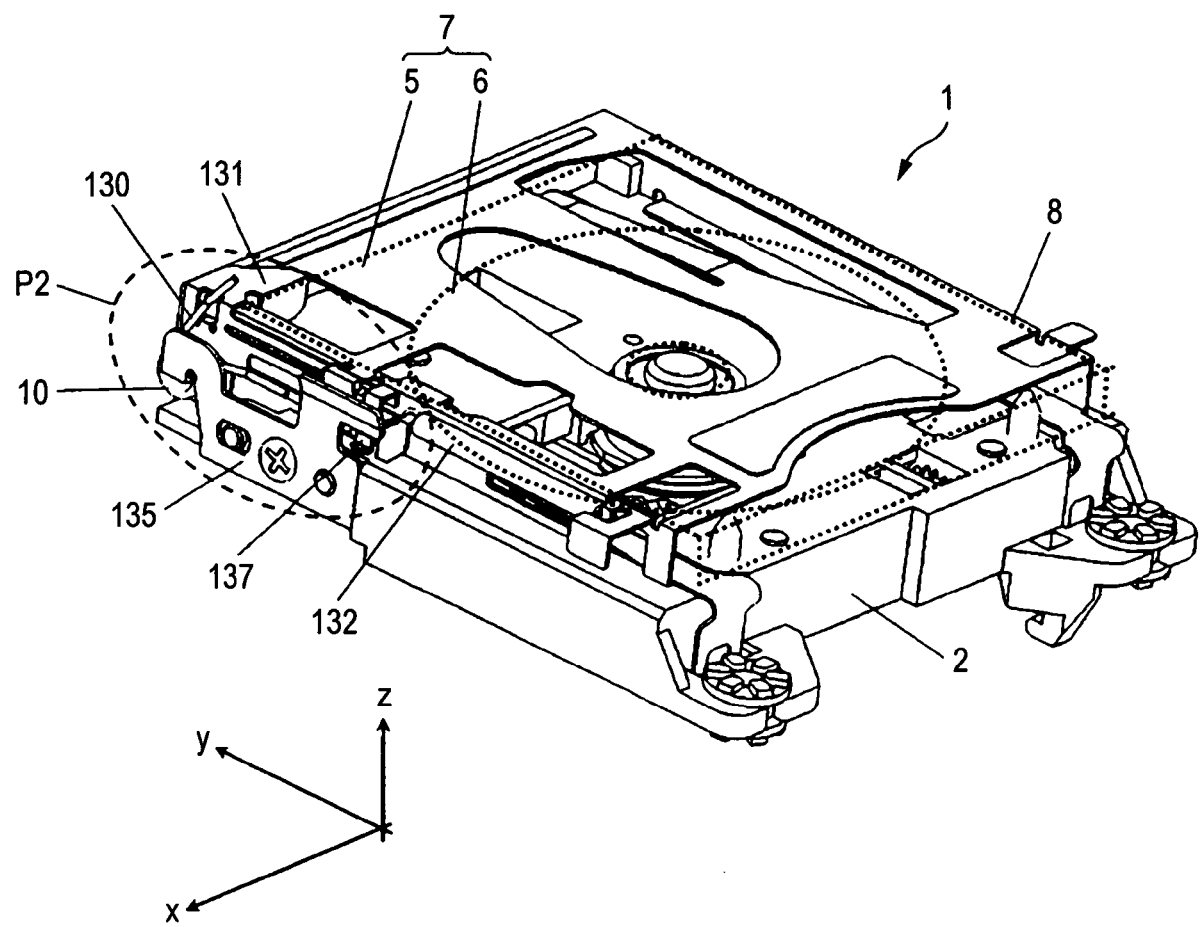
FIG. 18 is a perspective view showing an outer appearance of an information reproducing device in Embodiment 2 when the information recording medium housing portion is set to its close state.

FIG. 18 is a perspective view showing an outer appearance of an information reproducing device 1 in Embodiment 2 of the present invention when the information recording medium housing portion 8 is set to its close state. In this case, for the sake of simplicity, the upper surface cover 3, the upper surface chassis 9, the upper surface cover open lever 4 used to open the information recording medium housing portion 8, the hook 11 that is displaced to cooperate with the upper surface cover open lever 4, and the hook energizing member 12 for energizing the hook 11, all shown in FIG. 2, are omitted from the information reproducing device 1 shown in FIG. 18.

In Embodiment 2, mechanism, hardware, operation, etc. are basically common to Embodiment 1 of the present invention except that the information recording medium 7 is ejected from the information recording medium housing portion 8 subsequently to the opening operation of the information recording medium housing portion 8 and that a structure of the pickup restrainer 94 is different, as described later. Therefore, explanation of the common portions will be omitted herein.

A configuration of the information reproducing device 1 in Embodiment 2 of the present invention will be explained with reference to FIG. 18 hereunder.

In FIG. 18, 130 is a torsion spring that energizes the information recording medium housing portion 8 in the opening direction. When the user operates the upper surface cover open lever 4 (see FIG. 2) of the information reproducing device 1, an engagement of the hook 11 (see FIG. 2) is released and then the information recording medium housing portion 8 is displaced around the housing portion supporting portion 10 by the torsion spring 130 into its open state. In Embodiment 2, the information reproducing device 1 loaded into the information recording medium housing portion 8 is ejected by an eject mechanism portion indicated by P2 in cooperation with this opening action.

Figure 19:
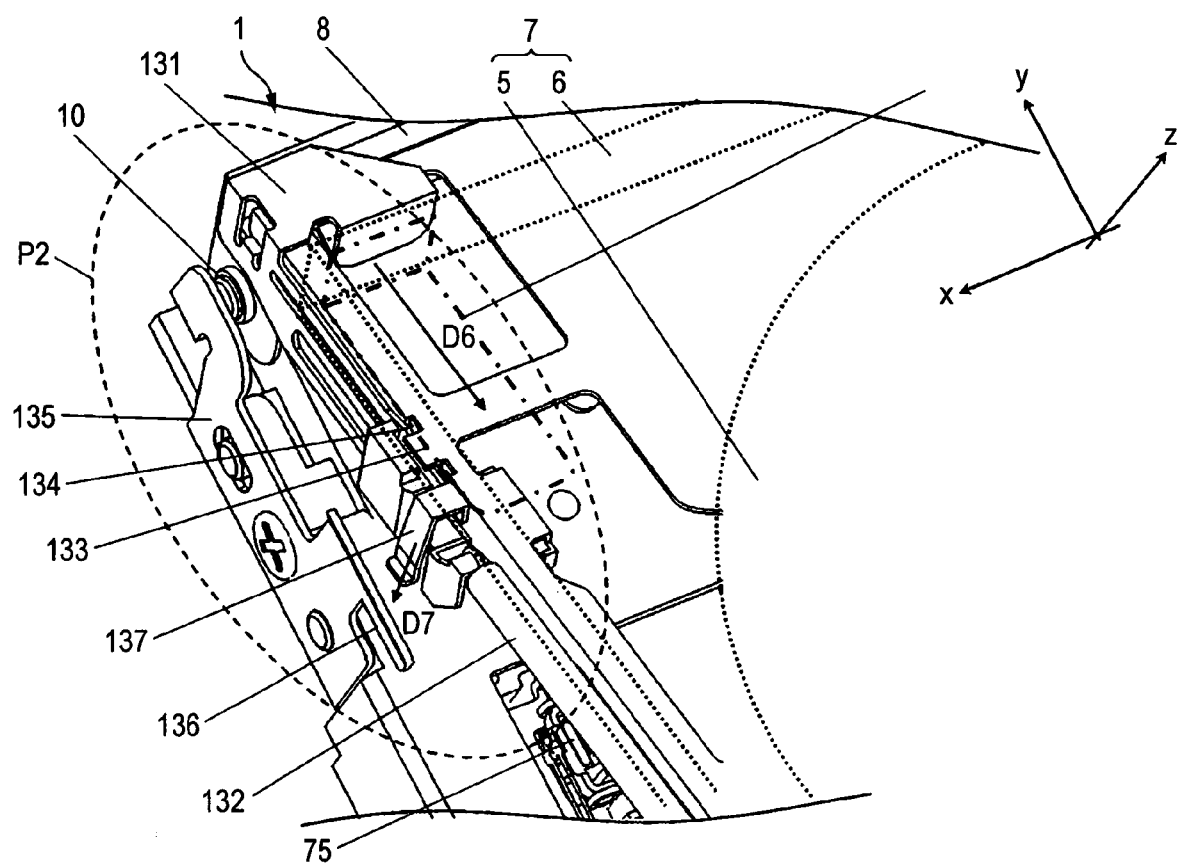
FIG. 19 is a perspective view showing an ejecting mechanism of the information reproducing device in Embodiment 2.

FIG. 19 is a perspective view showing an ejecting mechanism portion P2 of the information reproducing device 1 in Embodiment 2 of the present invention. An ejecting operation of the information reproducing device 1 will be explained in detail with reference to FIG. 19 together with FIG. 18 hereunder.

In FIG. 19, 131 is an eject lever, and 132 is a coil spring. The eject lever 131 is coupled to the coil spring 132 and is always energized in the D6 direction. When the information recording medium housing portion 8 is in its close state, a convex portion 134 provided to the eject lever 131 is engaged with an engaging portion 133 provided to the information recording medium housing portion 8 and thus the eject lever 131 is never moved in the D6 direction.

Also, 135 is a release plate, and 136 is an engaging portion provided to the release plate 135. Also, 137 is a claw portion provided to the eject lever 131. When the information recording medium housing portion 8 is opened by the user's operation, the claw portion 137 comes into contact with the engaging portion 136 of the release plate 135 and is displaced to the engaging portion 136 side, i.e., to the D7 direction. When the convex portion 134 provided to the eject lever 131 is released from the engaging portion 133 provided to the information recording medium housing portion 8 by the displacement of the claw portion 137 in the D7 direction, the coil spring 132 is compressed and the eject lever 131 is displaced in the D6 direction. Thus, when the information reproducing device 1 is loaded into the information recording medium housing portion 8, such information reproducing device 1 is ejected in the D6 direction.

Also, 94 is the pickup restrainer. As shown in FIG. 19, the pickup restrainer 94 is a plate-like member that is adhered/held on the lower portion of the eject lever 131 with an adhesives, or the like, for example. As described above, since the eject lever 131 is constructed to move in the D6 direction along with the loading/unloading of the information recording medium 7, the pickup restrainer 94 that restrains a displacement exceeding a normal operation range of the pickup 75 (a positional relationship with the pickup will be described later) is displaced in the horizontal direction of the recording surface of the information recording medium 7 following upon the loading/unloading of the information recording medium 7.

Figure 20:
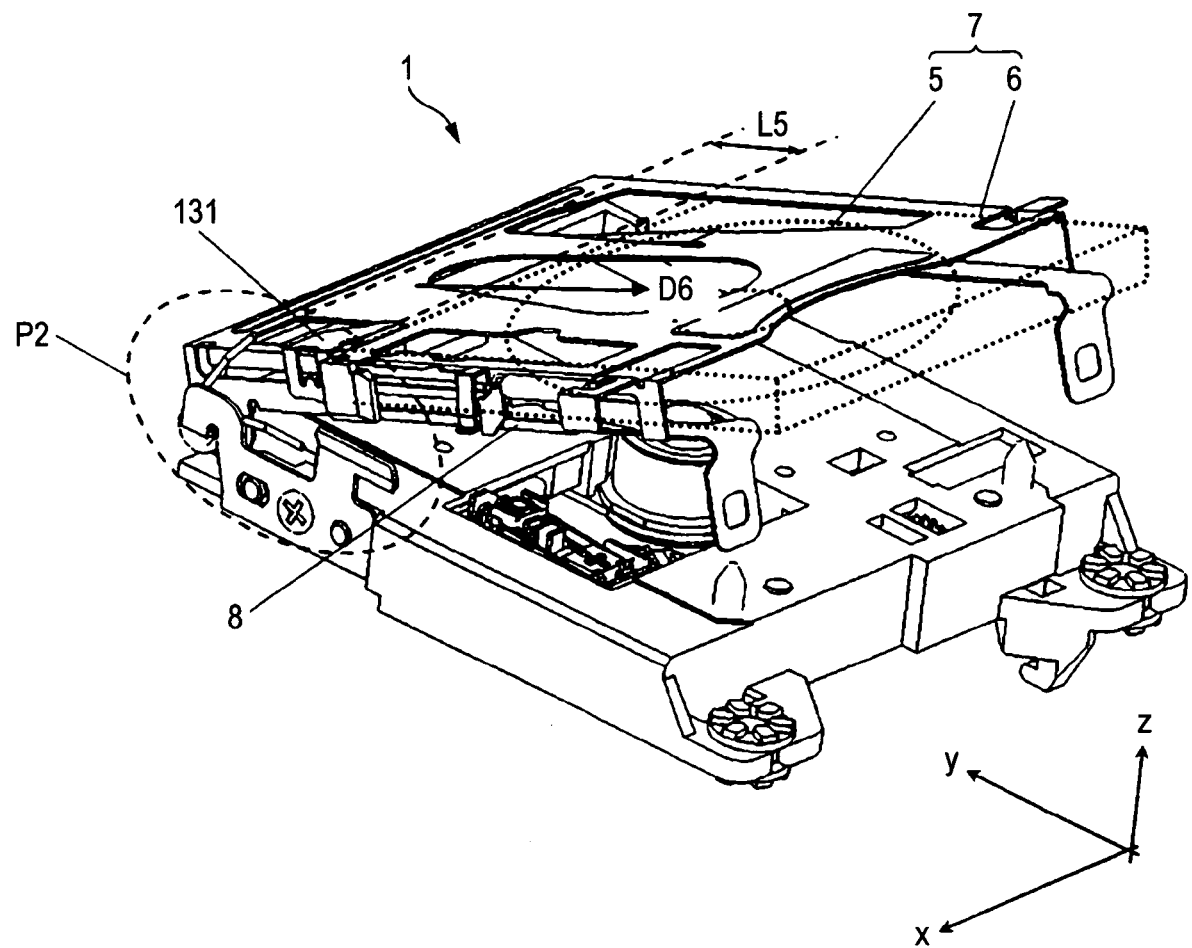
FIG. 20 is a perspective view showing an outer appearance of the information reproducing device in Embodiment 2 when the information recording medium housing portion is set to its open state.

FIG. 20 is a perspective view showing an outer appearance of the information reproducing device 1 in Embodiment 2 of the present invention when the information recording medium housing portion 8 is set to its open state.

The eject lever 131 is moved in a range of L5 by the stopper (not shown). Finally the information recording medium 7 is ejected from the information recording medium housing portion 8 together with the movement of the eject lever 131 in the D6 direction. When the information recording medium housing portion 8 is displaced into its open state, the eject mechanism portion P2 is operated similarly to the above processes regardless of the presence/absence of the information recording medium 7 in the information recording medium housing portion 8.

Also, when the information recording medium 7 is loaded into the information recording medium housing portion 8, the eject lever 131 is pushed into the inside of the information recording medium housing portion 8 by the outer peripheral end of the cartridge 6 of the inserted information recording medium 7. Then, as shown in FIG. 19, the convex portion 134 provided to the eject lever 131 is engaged with the engaging portion 133 provided to the information recording medium housing portion 8, and thus the loading of the information recording medium 7 into the information recording medium housing portion 8 is completed. Then, when the information recording medium housing portion 8 is closed by the user, the claw portion 137 provided to the eject lever 131 is fitted into the engaging portion 136 provided to the release plate 135. Thus, the information recording medium 7 is brought into a state that the information can be played by the information reproducing device 1.

Figure 21:
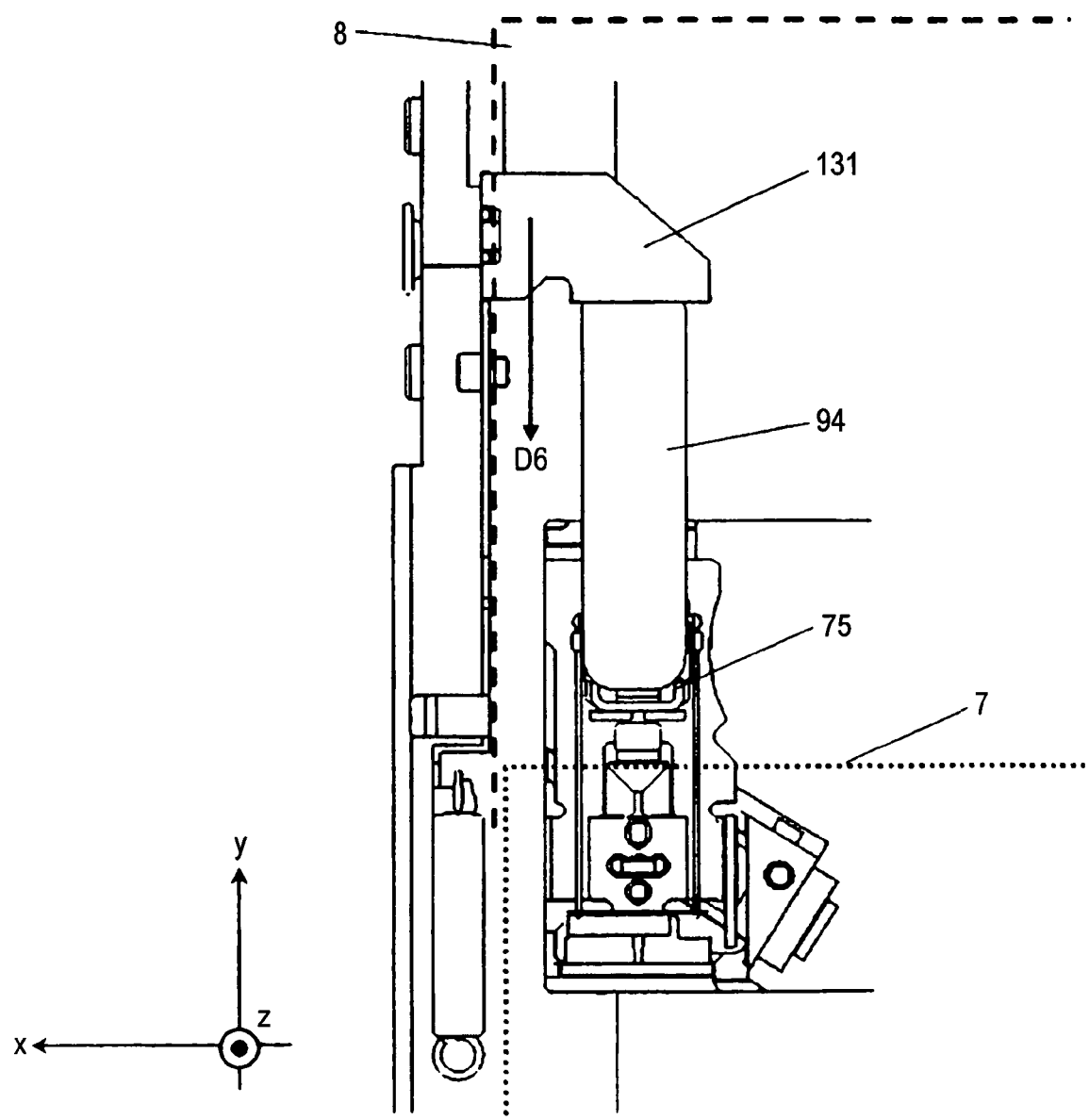
FIG. 21 is a top view showing a configuration of a pickup restrainer and its peripheral portion of the information reproducing device in Embodiment 2.

FIG. 21 is a top view showing a configuration of the pickup restrainer 94 and its peripheral portion of the information reproducing device 1 in Embodiment 2 of the present invention.

A positional relationship between the pickup restrainer 94 and the pickup 75 in Embodiment 2 will be explained with reference to FIG. 21 hereunder.

FIG. 21 shows a state that the information recording medium 7 is not loaded into the information recording medium housing portion 8. A position and a size of the pickup restrainer 94 is set such that the pickup restrainer 94 is arranged over the pickup 75 (in the + direction of the z-axis) in this state. As already explained in detail in Embodiment 1, it is needless to say that an interval between the pickup restrainer 94 and the pickup 75 in the z-axis direction is set in such a way that the pickup restrainer 94 can restrain a displacement of the pickup 75 exceeding a normal operating range in this state.

When the information recording medium 7 is inserted into the information recording medium housing portion 8, such information recording medium 7 is pushed into in the + direction of the y-axis, i.e., the direction opposite to the D6 direction by the user. The eject lever 131 is further pushed into in the + direction of the y-axis even after the outer peripheral end of the information recording medium 7 contacts the eject lever 131. As a result, the pickup restrainer 94 is disengaged from the upper portion of the pickup 75, and thus the pickup 75 is brought into a state that it can access the information recording medium 7.

Figure 22:
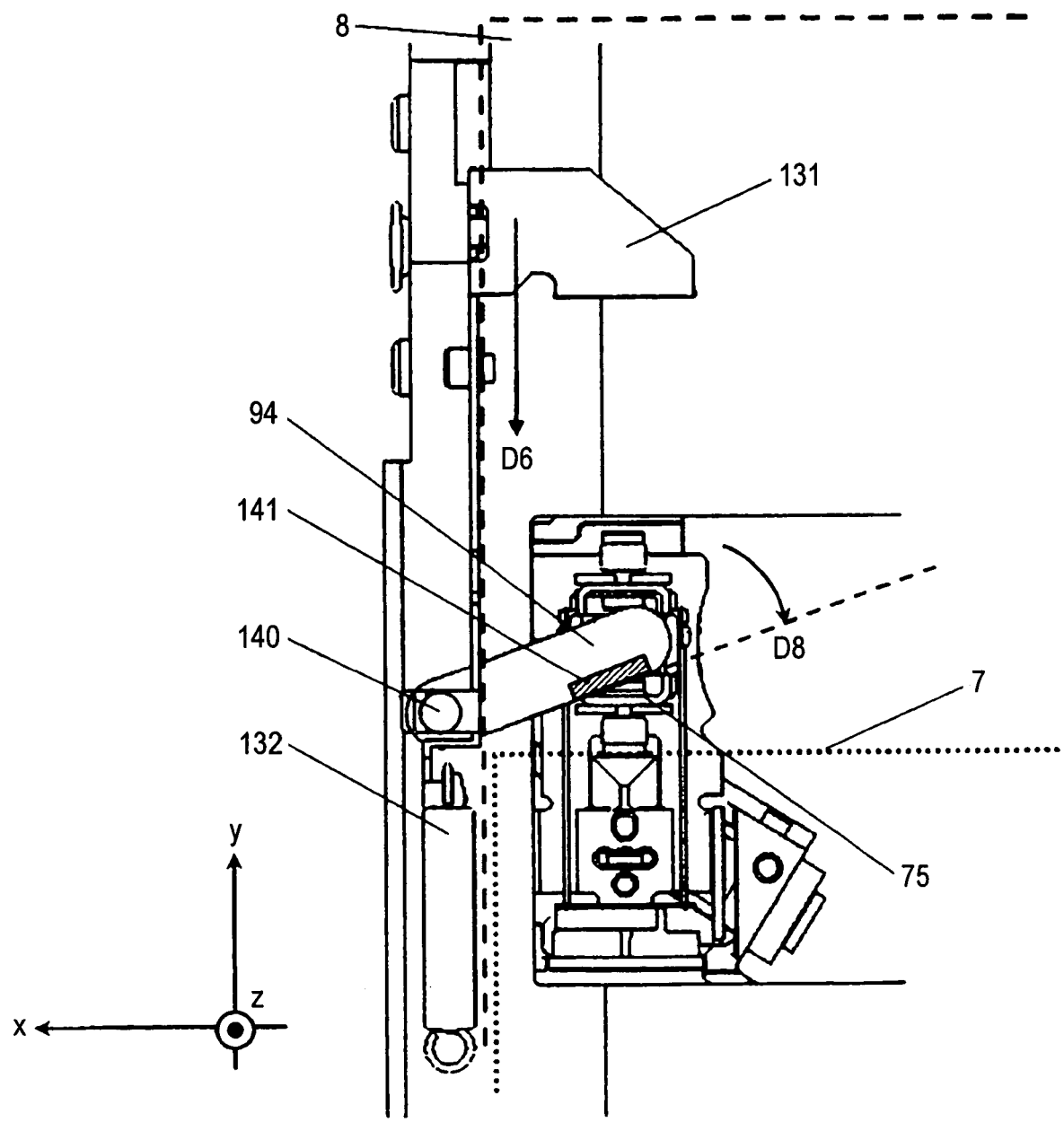
FIG. 22 is a top view showing a configuration of a pickup restrainer and its peripheral portion of the information reproducing device in Embodiment 2.

FIG. 22 is a top view showing a configuration of the pickup restrainer 94 and its peripheral portion of the information reproducing device 1 in Embodiment 2 of the present invention, and shows a configuration different from that shown in FIG. 21 as an application example of the present invention.

In the configuration shown in FIG. 22, the plate-like member constituting the pickup restrainer 94 is arranged in vicinity of the coil spring 132 that is coupled to the eject lever 131. This portion also constitutes a part of the eject lever 131 and the pickup restrainer 94 is moved in the D6 direction and its opposite direction with a motion of the eject lever 131. Therefore, this configuration can achieve the same effects and advantages as those explained with reference to FIG. 21.

Also, in FIG. 22, the plate-like member constituting the pickup restrainer 94 may be supported by providing a restrainer supporting portion 140 to a portion that does not operate together with a motion of the eject lever 131, e.g., the upper surface chassis (see FIG. 8). Then, the plate-like member may be energized in the D8 direction by providing the torsion spring, the stopper, or the like (not shown) near the restrainer supporting portion 140, and then this plate-like member may be held while such plate-like member is being energized to the position of the pickup 75 by the stopper (not shown) In other words, the pickup restrainer 94 for restraining a displacement of the pickup 75 exceeding a normal operating range may be constructed by the plate-like member whose end portion is rotatably supported, and this plate-like member may be engaged with the elastic member such as the torsion spring, or the like such that the elastic member energizes the plate-like member in a predetermined direction.

In addition, when the plate-like member constituting the pickup restrainer 94 does not operate together with a motion of the elect lever 131, such a configuration is relatively simple in structure that the outer peripheral end of the information recording medium 7 to be loaded/unloaded should be brought directly into contact with the plate-like member to displace the plate-like member. Therefore, it is desirable that the outer peripheral end of the information recording medium 7 should come into contact with the plate-like member without fail by providing a thick portion 141 to the portion that contacts the outer peripheral end of the information recording medium 7. This thick portion 141 may be constructed integrally with the plate-like member constituting the pickup restrainer 94, or a process of increasing substantially a thickness of a part of the plate-like member by knocking a pin, or the like, for example, into the plate-like member may be applied. This arrangement makes it certain that the plate-like member constituting the pickup restrainer 94 is turned.

As explained in detail in Embodiment 1, it is needless to say that Embodiment 2 can be constructed such that the control portion 35 (see FIG. 17) carries the pickup 75 to a position where the pickup restrainer 94 is arranged, in response to the open/close state of the information recording medium housing portion 8.

Also, the pickup 75 and the pickup restrainer 94 may be set not to contact mutually in the position where the pickup restrainer 94 is arranged, or the pickup restrainer 94 may be brought into contact with a part of the pickup 75.

Also, when the pickup restrainer 94 explained in FIG. 8 to FIG. 16, FIG. 19, FIG. 21, FIG. 22, etc. is arranged to cover the ± directions of the x-axis in which the optical unit 21 is moved, i.e., the inner peripheral position to the outer peripheral position of the information recording medium 7, a displacement of the pickup 75 exceeding a normal operating range can be restrained not to carry the optical unit 21 in the + direction of the x-axis.

In this manner, the information reproducing device in Embodiment is constructed to protect the pickup by displacing the pickup restrainer, which restrains a displacement of the pickup 75 exceeding a normal operating range, in response to the loading/unloading of the information recording medium into/from the information recording medium housing portion. Therefore, the pickup restrainer can come close to or contact the pickup in answer to the loading/unloading to protect this pickup, and can absorb effectively the impact force, which is applied to the optical pickup by the very strong impact such as the drop impact, or the like, to protect the pickup and its peripheral mechanisms from the failure. In addition, since the independent housing portion, or the like to protect the pickup and its peripheral mechanisms is not needed, the pickup and its peripheral mechanisms can be protected without an increase of size of the information reproducing device. In other words, in the information reproducing device used for the mobile application, the failure or the defective operation of the optical pickup and its peripheral mechanisms can be prevented from the very strong impact such as the drop impact, or the like not to increase a size of the device.

Here, an acceleration sensor for sensing an acceleration may be provided to the information reproducing device 1 explained in Embodiment 1 and Embodiment 2 or the information reproducing device installing device such as notebook personal computer, PDA, cellular phone, or the like equipped with the information reproducing device 1, and then the pickup 75 may be driven similarly based on an output signal of this acceleration sensor. Accordingly, the pickup 75 and its peripheral mechanisms are hard to break down much more. This operation will be explained with reference to FIG. 6 and FIG. 17 hereunder.

When the information reproducing device 1 is falling, the output signal of the acceleration sensor is input into the processing circuit 117 shown in FIG. 17 or a processing circuit (not shown), is analog-digital converted, and then is input into the pickup driving circuit 118. The pickup driving circuit 118 controls a position of the pickup 75 based on this input signal before the information reproducing device 1 runs into the ground, or the like. As the position control of the pickup 75, it may be considered that, for example, the pickup 75 should be driven to the direction opposite to the falling direction and then held, and the like.

For example, when the information reproducing device 1 falls in the + direction of the Z-axis shown in FIG. 6, the pickup 75 is held in the − direction of the Z-axis by feeding a current to the focus coil 91. Therefore, the impact of the collision can be lessened and thus the pickup 75 and its peripheral mechanisms can be hardly broken down. It is not limited to this example in which direction with respect to the falling direction the pickup 75 should be driven and held, and the direction may be varied appropriately.

As described above, the information reproducing device according to the present invention can be applied to all information reproducing devices including the mobile application, which may be subjected to the strong impact caused by the drop, or the like. The information reproducing device of the present invention can be applied to the DVD playing device, the DVD recording/playing device, or the like, which is built in notebook computer, PDA, cellular phone, or the like, as such device.

This application is based upon and claims the benefit of priority of Japanese Patent Application No 2005-248974 filed on Aug. 30, 2005, the content of which is incorporated herein by references in its entirety.

What is claimed is:

1. An information reproducing device for reproducing information recorded at least on an information recording medium, comprising:
   an information recording medium housing portion for housing the information recording medium that is detachably attached;
   a pickup for reading information recorded at least on the information recording medium; and
   a pickup restrainer for restraining a movement of the pickup for preventing the pickup from breaking down, wherein:
   the pickup restrainer goes away from the pickup in answer to the loading of the information recording medium into the information recording medium housing portion and comes close to the pickup in answer to the unloading of the information recording medium, and
   the pickup restrainer is displaced in a normal direction to a recording surface of the information recording medium in answer to the unloading of the information recording medium.

2. The information reproducing device according to claim 1, wherein the pickup restrainer is formed of an elastic tongue-like member.

3. The information reproducing device according to claim 1, wherein the pickup restrainer restrains a housing position of the information recording medium when the information recording medium is inserted into the information recording medium housing portion.

4. The information reproducing device according to claim 1, wherein a treatment of reducing a sliding friction is applied to a surface of the pickup restrainer.

5. An information reproducing device for reproducing information recorded at least on an information recording medium, comprising:
   an information recording medium housing portion for housing the information recording medium that is detachably attached;
   a pickup for reading information recorded at least on the information recording medium; and
   a pickup restrainer for restraining a movement of the pickup for preventing the pickup from breaking down, wherein:
   the pickup restrainer goes away from the pickup in answer to the loading of the information recording medium into the information recording medium housing portion and comes close to the pickup in answer to the unloading of the information recording medium, and
   the pickup restrainer is displaced in a horizontal direction of the recording surface of the information recording medium in answer to the unloading of the information recording medium.

6. The information reproducing device according to claim 5, wherein the pickup restrainer is formed of a plate-like member whose end portion is supported rotatably.

7. The information reproducing device according to claim 6, wherein the plate-like member is engaged with an elastic member, and the elastic member energizes the plate-like member in a predetermined direction.

8. The information reproducing device according to claim 6, wherein a portion of the plate-like member, which comes into contact with the information recording medium when the information recording medium is unloaded, is substantially thickened.

9. An information reproducing device for reproducing information recorded at least on an information recording medium, comprising:
   a retractable information recording medium housing portion for housing the information recording medium that is detachably attached;
   a pickup for reading at least information recorded on a recording surface of the information recording medium;
   a carrier for carrying the pickup along the recording surface of the information recording medium housed in the information recording medium housing portion in a predetermined direction;
   a controller for controlling the carrier; and
   a pickup restrainer for restraining a movement of the pickup exceeding a normal operating range for preventing the pickup from breaking down;
   wherein the pickup restrainer is constructed to displace in answer to loading/unloading of the information recording medium, and the controller controls the carrier in response to open/close of the information recording medium housing portion to carry the pickup to a predetermined position.

10. The information reproducing device according to claim 9, wherein a movement of the pickup exceeding a normal operating range is restrained by the pickup restrainer in the predetermined position.

11. The information reproducing device according to claim 9, further comprising:
   a sensor for sensing the unloading of the information recording medium;
   wherein the controller carries the pickup to a predetermined position based on an output of the sensor.

12. The information reproducing device according to claim 9, further comprising:
   an instructing portion for instructing the unloading of the information recording medium;
   wherein the controller carries the pickup to a predetermined position based on an output of the instructing portion.

13. An information reproducing device for reproducing information recorded at least on an information recording medium, comprising:
   an information recording medium housing portion for housing the information recording medium that is detachably attached therein;
   a pickup for reading information recorded on at least the information recording medium; and
   a pickup restrainer for restraining a movement of the pickup exceeding a normal operating range for preventing the pickup from breaking down, wherein:
   the pickup restrainer restrains a movement of the pickup in a state that the information recording medium is unloaded from the information recording medium housing portion, and a recording surface of the information recording medium restrains a movement of the pickup in a state that the information recording medium is loaded into the information recording medium housing portion, and
   the pickup contains an objective lens that focuses a light at least on the recording surface of the information recording medium, a projection portion projected toward a direction of the recording surface of the information recording medium is provided in vicinity of the pickup restrainer, and the projection portion comes in contact with the pickup restrainer or the recording surface of the information recording medium.

14. The information reproducing device according to claim 13, wherein the projection portion is constructed to project to a position that is closer to the recording surface of the information recording medium than the objective lens.

15. The information reproducing device according to claim 9, further comprising:
   an acceleration sensor for sensing an acceleration;
   wherein the pickup is driven by an output of the acceleration sensor.

16. An information reproducing device for reproducing information recorded at least on an information recording medium, comprising:
   an information recording medium housing portion for housing the information recording medium that is detachably attached therein;
   a pickup for reading information recorded on at least the information recording medium;
   a pickup restrainer for restraining a movement of the pickup exceeding a normal operating range for preventing the pickup from breaking down; and
   an acceleration sensor for sensing an acceleration;
   wherein the pickup is driven by an output of the acceleration sensor, and
   wherein the pickup restrainer restrains a movement of the pickup in a state that the information recording medium is unloaded from the information recording medium housing portion, and the recording surface of the information recording medium restrains a movement of the pickup in a state that the information recording medium is loaded into the information recording medium housing portion.

17. An information reproducing device for reproducing information recorded at least on an information recording medium, comprising:
   a retractable information recording medium housing portion for housing the information recording medium that is detachably attached;
   a pickup for reading at least information recorded on a recording surface of the information recording medium; and
   a pickup restrainer for restraining a movement of the pickup exceeding a normal operating range for preventing the pickup from breaking down;
   wherein the pickup restrainer is constructed to displace in answer to loading/unloading of the information recording medium, and the pickup is carried to a predetermined position in response to open/close of the information recording medium housing portion.

* * * * *